(12) United States Patent
Herbert et al.

(10) Patent No.: US 8,459,807 B2
(45) Date of Patent: Jun. 11, 2013

(54) SHEETING WITH COMPOSITE IMAGE THAT FLOATS

(75) Inventors: Sammuel D. Herbert, Woodbury, MN (US); Charles J. Studiner, IV, Cottage Grove, MN (US); Robert L. W. Smithson, Mahtomedi, MN (US); Robert T. Krasa, Hudson, WI (US); Pingfan Wu, Woodbury, MN (US); Douglas S. Dunn, Maplewood, MN (US); Michael W. Dolezal, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 324 days.

(21) Appl. No.: 12/663,755

(22) PCT Filed: Jun. 17, 2008

(86) PCT No.: PCT/US2008/067180
§ 371 (c)(1),
(2), (4) Date: Dec. 9, 2009

(87) PCT Pub. No.: WO2009/009258
PCT Pub. Date: Jan. 15, 2009

(65) Prior Publication Data
US 2010/0182666 A1 Jul. 22, 2010

Related U.S. Application Data

(60) Provisional application No. 60/949,092, filed on Jul. 11, 2007.

(51) Int. Cl.
*G02B 5/124* (2006.01)
(52) U.S. Cl.
USPC ........................................................ 359/530

(58) Field of Classification Search
USPC .................................................. 359/530, 531
See application file for complete search history.

(56) References Cited

U.S. PATENT DOCUMENTS

| 1,905,716 A | 4/1933 | Ives |
| 1,918,705 A | 7/1933 | Ives |

(Continued)

FOREIGN PATENT DOCUMENTS

| CA | 2 326 180 | 10/1999 |
| CA | 2 400 894 | 8/2001 |

(Continued)

OTHER PUBLICATIONS

3M Security Systems Division, 3M™ Authentication Reader Product Fact Sheet, (2004), 4 pages.

(Continued)

*Primary Examiner* — Euncha Cherry
(74) *Attorney, Agent, or Firm* — Daniel R. Pastirik; James A. Baker

(57) ABSTRACT

Techniques are described for forming microlens sheeting having composite images that appear to float with respect to the plane of the sheeting. As one example, a method comprises forming one or more images within a sheeting having a surface of microlenses, wherein at least one of the images is a partially complete image, and wherein each of the images is associated with a different one of the microlenses, wherein the microlenses have refractive surfaces that transmit light to positions within the sheeting to produce a plurality of composite images from the images formed within the sheeting so that each of the composite images appears to float with respect to the plane of the sheeting, and wherein forming the one or more images comprises forming the one or more images such that each of the composite images is associated with a different viewing angle range.

21 Claims, 20 Drawing Sheets

U.S. PATENT DOCUMENTS

| | | |
|---|---|---|
| 2,039,648 A | 5/1936 | Ives |
| 2,063,985 A | 12/1936 | Coffey |
| 2,279,825 A | 4/1942 | Kaszab |
| 2,326,634 A | 8/1943 | Gebhard et al. |
| 2,500,511 A | 3/1950 | Bonnet |
| 2,622,472 A | 12/1952 | Bonnet |
| 2,833,176 A | 5/1958 | Ossoinak |
| 3,154,872 A | 11/1964 | Nordgren |
| 3,161,509 A | 12/1964 | Howe et al. |
| 3,306,974 A | 2/1967 | Cunnally |
| 3,357,770 A | 12/1967 | Clay |
| 3,365,350 A | 1/1968 | Cahn |
| 3,442,569 A | 5/1969 | Bonnet |
| 3,459,111 A | 8/1969 | Cooper, Jr. |
| 3,503,315 A | 3/1970 | Montebello |
| 3,584,369 A | 6/1971 | Montebello |
| 3,607,273 A | 9/1971 | Kinney |
| 3,613,539 A | 10/1971 | Dudley |
| 3,676,130 A | 7/1972 | Burckhardt et al. |
| 3,706,486 A | 12/1972 | de Montebello |
| 3,751,258 A | 8/1973 | Howe et al. |
| 3,801,183 A | 4/1974 | Sevelin et al. |
| 4,034,555 A | 7/1977 | Rosenthal |
| 4,082,426 A | 4/1978 | Brown |
| 4,099,838 A | 7/1978 | Cook et al. |
| 4,121,011 A | 10/1978 | Glover et al. |
| 4,200,875 A | 4/1980 | Galanos |
| 4,315,665 A | 2/1982 | Haines |
| 4,420,527 A | 12/1983 | Conley |
| 4,424,990 A | 1/1984 | White et al. |
| 4,541,727 A | 9/1985 | Rosenthal |
| 4,541,830 A | 9/1985 | Hotta et al. |
| 4,552,442 A | 11/1985 | Street |
| 4,557,590 A | 12/1985 | Winnek |
| 4,618,552 A | 10/1986 | Tanaka et al. |
| 4,621,898 A | 11/1986 | Cohen |
| 4,629,667 A | 12/1986 | Kistner et al. |
| 4,632,895 A | 12/1986 | Patel et al. |
| 4,634,220 A | 1/1987 | Hockert et al. |
| 4,650,283 A | 3/1987 | Orensteen et al. |
| 4,668,063 A | 5/1987 | Street |
| 4,688,894 A | 8/1987 | Hockert |
| 4,691,993 A | 9/1987 | Porter et al. |
| 4,700,207 A | 10/1987 | Vanier et al. |
| 4,708,920 A | 11/1987 | Orensteen et al. |
| 4,714,656 A | 12/1987 | Bradshaw et al. |
| 4,732,453 A | 3/1988 | de Montebello et al. |
| 4,743,526 A | 5/1988 | Ando et al. |
| 4,757,350 A | 7/1988 | Street |
| 4,772,582 A | 9/1988 | DeBoer |
| 4,775,219 A | 10/1988 | Appeldorn et al. |
| 4,783,141 A | 11/1988 | Baba et al. |
| 4,799,739 A | 1/1989 | Newswanger |
| 4,833,124 A | 5/1989 | Lum |
| 4,876,235 A | 10/1989 | DeBoer |
| 4,917,292 A | 4/1990 | Drexler |
| 4,920,039 A | 4/1990 | Fotland et al. |
| 4,927,238 A | 5/1990 | Green et al. |
| 4,935,335 A | 6/1990 | Fotland |
| 5,064,272 A | 11/1991 | Bailey et al. |
| 5,091,483 A | 2/1992 | Mazurek et al. |
| 5,105,206 A | 4/1992 | Sarraf et al. |
| 5,169,707 A | 12/1992 | Faykish et al. |
| 5,183,597 A | 2/1993 | Lu |
| 5,204,160 A | 4/1993 | Rouser |
| 5,244,288 A | 9/1993 | Nagaoka et al. |
| 5,254,390 A | 10/1993 | Lu |
| 5,264,278 A | 11/1993 | Mazurek et al. |
| 5,279,912 A | 1/1994 | Telfer et al. |
| 5,308,737 A | 5/1994 | Bills et al. |
| 5,326,619 A | 7/1994 | Dower et al. |
| 5,330,799 A | 7/1994 | Sandor et al. |
| 5,355,188 A | 10/1994 | Biles et al. |
| 5,359,454 A | 10/1994 | Steenblik et al. |
| 5,360,694 A | 11/1994 | Thien et al. |
| 5,364,740 A | 11/1994 | Fohrenkamm et al. |
| 5,449,200 A | 9/1995 | Andric et al. |
| 5,449,597 A | 9/1995 | Sawyer |
| 5,455,689 A | 10/1995 | Taylor et al. |
| 5,459,016 A | 10/1995 | Debe et al. |
| 5,491,045 A | 2/1996 | DeBoer et al. |
| 5,506,300 A | 4/1996 | Ward et al. |
| 5,514,730 A | 5/1996 | Mazurek et al. |
| 5,521,035 A | 5/1996 | Wolk et al. |
| 5,554,432 A | 9/1996 | Sandor et al. |
| 5,589,246 A | 12/1996 | Calhoun et al. |
| 5,594,841 A | 1/1997 | Schutz |
| 5,639,580 A | 6/1997 | Morton |
| 5,642,226 A | 6/1997 | Rosenthal |
| 5,644,431 A | 7/1997 | Magee |
| 5,671,089 A | 9/1997 | Allio |
| 5,680,171 A | 10/1997 | Lo et al. |
| 5,681,676 A | 10/1997 | Telfer et al. |
| 5,685,939 A | 11/1997 | Wolk et al. |
| 5,689,372 A | 11/1997 | Morton |
| 5,691,846 A | 11/1997 | Benson, Jr. et al. |
| 5,706,133 A | 1/1998 | Orensteen et al. |
| 5,712,731 A | 1/1998 | Drinkwater et al. |
| 5,717,844 A | 2/1998 | Lo et al. |
| 5,738,746 A | 4/1998 | Billingsley et al. |
| 5,744,291 A | 4/1998 | Ip |
| 5,757,550 A | 5/1998 | Gulick, Jr. |
| 5,770,124 A | 6/1998 | Marecki et al. |
| 5,828,488 A | 10/1998 | Ouderkirk et al. |
| 5,837,347 A | 11/1998 | Marecki |
| 5,843,617 A | 12/1998 | Patel et al. |
| 5,850,278 A | 12/1998 | Lo et al. |
| 5,850,580 A | 12/1998 | Taguchi et al. |
| 5,856,061 A | 1/1999 | Patel et al. |
| 5,877,895 A | 3/1999 | Shaw et al. |
| 5,882,774 A | 3/1999 | Jonza et al. |
| 5,889,118 A | 3/1999 | Delgado et al. |
| 5,894,069 A | 4/1999 | Wen et al. |
| 5,896,230 A | 4/1999 | Goggins |
| 5,935,758 A | 8/1999 | Patel et al. |
| 5,945,249 A | 8/1999 | Patel et al. |
| 5,986,781 A | 11/1999 | Long |
| 5,994,026 A | 11/1999 | DeBoer et al. |
| 6,019,287 A | 2/2000 | Mann |
| 6,028,621 A | 2/2000 | Yakubovich |
| 6,057,067 A | 5/2000 | Isberg et al. |
| 6,069,680 A | 5/2000 | Kessler et al. |
| 6,084,713 A | 7/2000 | Rosenthal |
| 6,092,465 A | 7/2000 | Agronin |
| 6,095,566 A | 8/2000 | Yamamoto et al. |
| 6,110,645 A | 8/2000 | DeBoer et al. |
| 6,197,474 B1 | 3/2001 | Niemeyer et al. |
| 6,212,805 B1 | 4/2001 | Hill |
| 6,222,650 B1 | 4/2001 | Long |
| 6,228,555 B1 | 5/2001 | Hoffend, Jr. et al. |
| 6,242,152 B1 | 6/2001 | Staral et al. |
| 6,280,891 B2 | 8/2001 | Daniel et al. |
| 6,285,001 B1 | 9/2001 | Fleming et al. |
| 6,286,873 B1 | 9/2001 | Seder |
| 6,288,842 B1 | 9/2001 | Florczak et al. |
| 6,291,143 B1 | 9/2001 | Patel et al. |
| 6,300,502 B1 | 10/2001 | Kannan et al. |
| 6,351,537 B1 | 2/2002 | Dovgodko et al. |
| 6,369,844 B1 | 4/2002 | Neumann et al. |
| 6,388,043 B1 | 5/2002 | Langer et al. |
| 6,398,270 B1 | 6/2002 | Fukui et al. |
| 6,468,715 B2 | 10/2002 | Hoffend, Jr. et al. |
| 6,531,230 B1 | 3/2003 | Weber et al. |
| 6,552,830 B2 | 4/2003 | Long |
| 6,602,578 B1 | 8/2003 | Tompkin et al. |
| 6,729,655 B1 | 5/2004 | Dorricott et al. |
| 6,781,733 B1 | 8/2004 | Hira |
| 6,791,723 B1 | 9/2004 | Vallmajo et al. |
| 6,919,892 B1 | 7/2005 | Cheiky et al. |
| 7,054,042 B2 | 5/2006 | Holmes et al. |
| 7,068,434 B2 | 6/2006 | Florczak et al. |
| 7,196,822 B2 | 3/2007 | Hu |
| 7,246,824 B2 | 7/2007 | Hudson |
| 7,253,958 B2 | 8/2007 | Aizenberg et al. |
| 7,255,909 B2 | 8/2007 | Mann et al. |
| 7,265,904 B2 | 9/2007 | Schilling et al. |
| 7,333,268 B2 | 2/2008 | Steenblik et al. |

| | | |
|---|---|---|
| 7,336,422 B2 | 2/2008 | Dunn et al. |
| 7,591,415 B2 | 9/2009 | Jesme |
| 7,648,744 B2 | 1/2010 | Kuo et al. |
| 2002/0054434 A1 | 5/2002 | Florczak et al. |
| 2002/0126396 A1 | 9/2002 | Dolgoff |
| 2002/0145807 A1 | 10/2002 | Nishikawa |
| 2003/0116630 A1 | 6/2003 | Carey et al. |
| 2005/0057812 A1 | 3/2005 | Raber |
| 2005/0142468 A1 | 6/2005 | Blood et al. |
| 2005/0142469 A1 | 6/2005 | Blood et al. |
| 2005/0161512 A1 | 7/2005 | Jones et al. |
| 2006/0029753 A1 | 2/2006 | Kuo et al. |
| 2006/0129489 A1 | 6/2006 | Hersch et al. |
| 2006/0209412 A1 | 9/2006 | Schilling et al. |
| 2006/0262411 A1 | 11/2006 | Dunn et al. |
| 2007/0081254 A1 | 4/2007 | Endle et al. |
| 2007/0115555 A1* | 5/2007 | Nellissen ............. 359/619 |
| 2007/0132227 A1 | 6/2007 | Dean |
| 2007/0196616 A1 | 8/2007 | Stalder et al. |
| 2007/0278194 A1* | 12/2007 | Hoelsher et al. ........ 219/121.6 |
| 2007/0284169 A1 | 12/2007 | Zabiega |
| 2007/0284546 A1 | 12/2007 | Ryzi et al. |
| 2008/0023890 A1 | 1/2008 | Sherman et al. |
| 2008/0024872 A1 | 1/2008 | Dunn et al. |
| 2008/0027199 A1 | 1/2008 | Mazurek et al. |
| 2008/0037131 A1 | 2/2008 | Steenblik et al. |
| 2008/0118862 A1 | 5/2008 | Dunn et al. |
| 2008/0130126 A1 | 6/2008 | Brooks et al. |

FOREIGN PATENT DOCUMENTS

| | | |
|---|---|---|
| CA | 2 400 897 | 2/2003 |
| DE | 198 04 997 | 2/1999 |
| EP | 0 175 504 | 3/1986 |
| EP | 0 314 134 | 5/1989 |
| EP | 0 363 919 | 4/1990 |
| EP | 0 404 004 | 12/1990 |
| EP | 0 583 776 | 2/1994 |
| EP | 0 615 860 | 9/1994 |
| EP | 0 655 347 | 5/1995 |
| EP | 0 658 443 | 6/1995 |
| EP | 0 673 785 | 9/1995 |
| EP | 0 688 351 | 8/1997 |
| EP | 1 079 274 | 2/2001 |
| EP | 1 130 541 | 9/2001 |
| GB | 1 308 116 | 2/1973 |
| GB | 1 433 025 | 4/1976 |
| GB | 2 083 726 | 3/1982 |
| JP | 01 065153 | 3/1989 |
| JP | 1-181083 | 12/1989 |
| JP | 03 068610 | 3/1991 |
| JP | 03 068611 | 3/1991 |
| JP | 4309583 | 11/1992 |
| JP | 5 188499 | 7/1993 |
| JP | 6308895 | 11/1994 |
| JP | 7-140571 | 6/1995 |
| JP | 07-281327 | 10/1995 |
| JP | 10-186276 | 7/1998 |
| JP | 2001-116917 | 4/2001 |
| WO | WO 83/03019 | 9/1983 |
| WO | WO 94/16392 | 7/1994 |
| WO | WO 94/20583 | 9/1994 |
| WO | WO 95/26281 | 10/1995 |
| WO | WO 96/24867 | 8/1996 |
| WO | WO 97/15173 | 4/1997 |
| WO | WO 97/46631 | 12/1997 |
| WO | WO 99/37949 | 7/1999 |
| WO | WO 99/42147 | 8/1999 |
| WO | WO 01/63341 | 8/2001 |
| WO | WO 02/22376 | 3/2002 |
| WO | WO 03/005075 | 1/2003 |
| WO | WO 03/022598 | 3/2003 |
| WO | WO 03/061983 | 7/2003 |
| WO | WO 03/093341 | 11/2003 |
| WO | WO 2004/111706 | 12/2004 |
| WO | WO 2006/125224 | 11/2006 |

OTHER PUBLICATIONS

3M Security Systems Division, 3M™ ePassport Reader Product Fact sheet, (2004), 6 pages.

3M Security Systems Division, 3M™ Full Page Reader Product Fact Sheet, (2004), 6 pages.

3M Security Systems Division, 3M™ Inspection Reader Product Fact Sheet, (2004), 2 pages.

Arnott, et al., "Attention switching in depth using random-dot autostereograms: Attention gradient asymmetries." *Perception and Psychophysics*, vol. 62 No. 7, (2000) pp. 1459-1473.

Backus, et al., "Human Cortical Activity Correlates With Stereoscopic Depth Perception", *The American Physiological Society, J. Neurophysiol, Stereo Depth Perception and Cortical Activity*, vol. 86, (Oct. 2001) pp. 2054-2068.

Ballard, et al., "Filtering the Image", *Computer Vision*, Prentice-Hall Inc. (1982) pp. 65-70.

Chau, et al., "Segregation by color and stereoscopic depth in three-dimensional visual space." *Perception and Psychophsics*, vol. 57 No. 7, (1995) pp. 1032-1044.

DeMontebello, "Processing and Display of Three-Dimensional Data II", *Proceedings of SPIE*, vol. 507, San Diego, (1984).

Dudknikov, et al., "Selecting the Parameters of the Lens-Array Photographing System in Integral Photography", *Sov. J. Opt. Technol.*, vol. 45, No. 6, (Jun. 1978).

Dudknikov, et al., "Obtaining a Portrait of a Person by the Integral Photography Method,", *Sov. J. Opt. Technol.* vol. 47 No. 9, pp. 562-563 (Sep. 1980).

Dudnikov et al., "Raster systems for producing of three-dimensional images", Leningrad, *Maschinostroeniye*, (1986), pp. 119-123.

Factiva WireWatch Message, "Shape-memory polymers offer new twist on applications", *Modern Plastics International, Chemical Business NewsBase*, Apr. 24, 2003.

Gugerty, "Situation Awareness during Driving: Explicit and Implicit Knowledge in Dynamic Spatial Memory." *Journal of Experimental Psychology: Applied*, vol. 3 No. 1, (1997) pp. 42-66.

He, et al., "Surfaces versus features in visual search." *Nature*, vol. 359, No. 6392, (1992) pp. 231-233.

Kasai, et al., "Attending to a location in three-dimensional space modulates early ERPs." *Cognitive Brain Research*, vol. 17, No. 2, (2003) pp. 273-285.

Kim et al., "Polyurethanes having shape memory effects", *Polymer*, vol. 37 No. 26, (1996) pp. 5781-5793.

Lendlein et al., "AB-polymer networks based on oligo($\epsilon$-caprolactone) segments showing shape-memory properties", *PNAS*, vol. 98 No. 3, (2001) pp. 842-847.

Lendlein and Kelch, "Shape-memory polymers", *Angew. Chem. Int. Ed.* vol. 41 (2002), pp. 2034-2057.

Lendlein and Langer, "Biodegradable, elastic shape-memory polymers for potential biomedical applications", *Science*, vol. 296, (2002) pp. 1673-1676.

Mazurek et al., "Novel materials based on silicone-acrylate copolymer networks", *Journal of Applied Polymer Science*, vol. 80, pp. 159-180, 2001.

Mazza, et al., "Foreground-background segmentation and attention: A change blindness study." Psychological Research, 69(3), pp. 201-210, 2005.

Nakayama, et al., "Serial and parallel processing of visual feature conjunctions", Nature, 320(6059), pp. 264-265, 1986.

O'Toole, et al., "On the preattentive accessibility of stereoscopic disparity: Evidence from visual search." Perception and Psychophysics, 59(2), pp. 202-218, 1997.

Pai, et al., "Microscopic flow visualization system for fluids in magnetic field", *J. of Magnetism & Magnetic Materials*, vol. 194 (1999) pp. 262-266.

Puhakka, et al., "Does preknowledge of target depth affect visual processing." Journal of Vision 3 (9), p. 599, 2003.

Rothrock, et al., "Applying the proximity compatibility and the control-display compatibility principles to engineering design interfaces." Human Factors and Ergonomics in Manufacturing, 16 (1), pp. 61-81, 1995.

Rumar, "The basic driver error: Late detection." Ergonomics, 33(10-11), pp. 1281-1290, 1990.

Weekly Reports of the Meetings of the Academy of Science published, in accordance with an academy decision dated Jul. 13, 1835, vol. 146, Jan.-Jun. 1908, pp. 446-451.

Wickens, et al., "The proximity compatibility principle: its psychological foundation and relevance to display design." Human Factors, 37 (3), pp. 473-494, 1995.

Wolfe, et al., "What attributes guide the development of visual attention and how do they do it?" Nature Reviews Neuroscience, 5 (6), pp. 495-501, Jun. 2004.

U.S. Appl. No. 12/257,182, filed Oct. 23, 2008 entitled "Methods of Forming Sheeting with Composite Images that Float and Sheeting with Composite Images that Float."

U.S. Appl. No. 61/158,827, filed Mar. 10, 2009 entitled "User Interface with a Composite Image That Floats.".

U.S. Appl. No. 12/257,223, filed Oct. 23, 2008 entitled "Methods of Forming Sheeting with Composite Images that Float and Sheeting with Composite Images that Float."

* cited by examiner

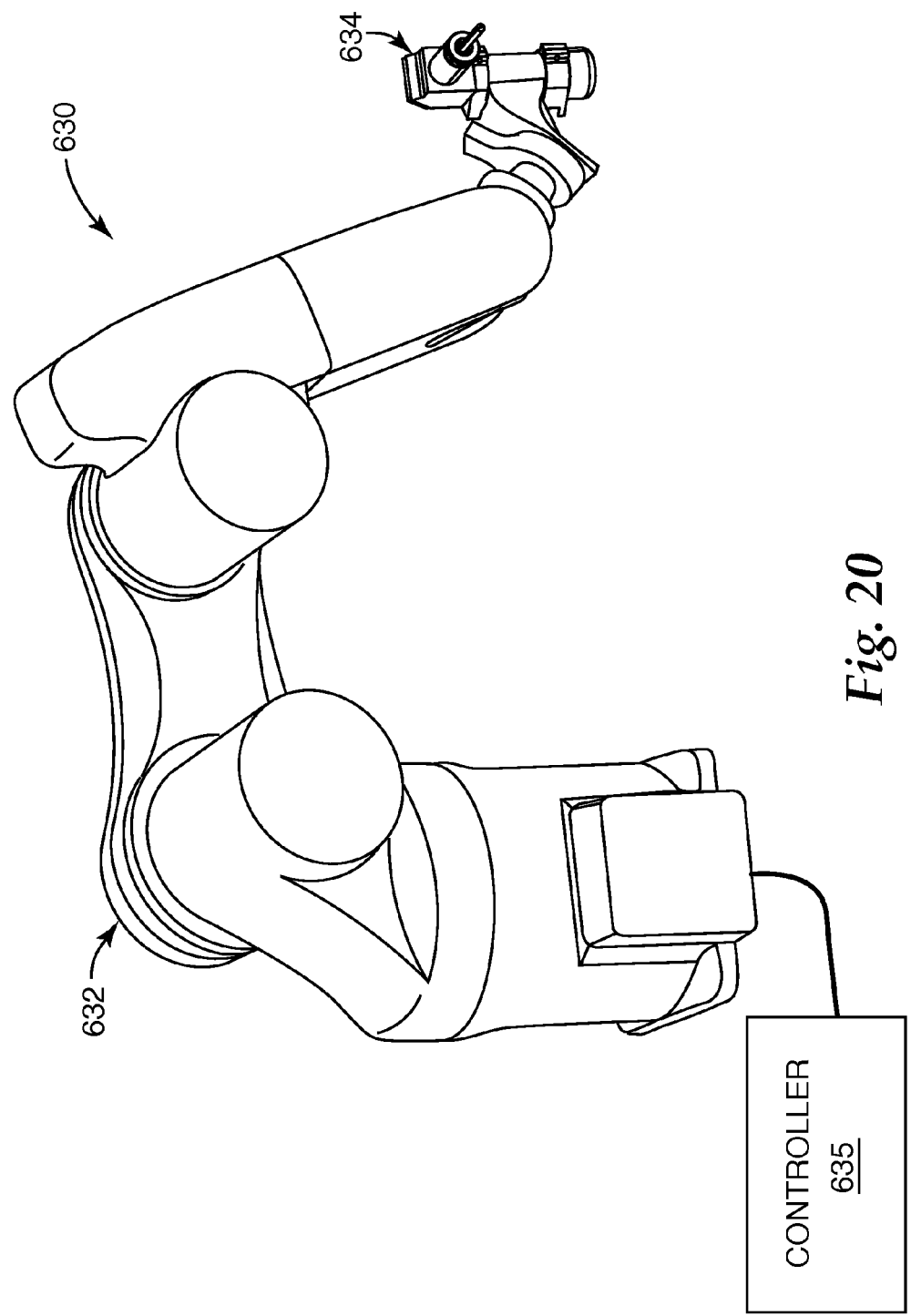

SHEETING WITH COMPOSITE IMAGE THAT FLOATS

CROSS REFERENCE TO RELATED APPLICATIONS

This application is a national stage filing under 35 U.S.C. 371 of PCT/US2008/067180, filed Jun. 17, 2008, which claims the benefit of U.S. Provisional Application No. 60/949,092, filed Jul. 11, 2007, the disclosure of which is incorporated by reference in their entirety herein.

FIELD OF THE INVENTION

The present invention relates to sheeting that provides one or more composite images that are perceived by an observer to be suspended in space relative to the sheeting, and in which the perspective of the composite image changes with the viewing angle.

BACKGROUND OF THE INVENTION

Sheeting materials having a graphic image or other mark have been widely used, particularly as labels for authenticating an article or document. For example, sheetings such as those described in U.S. Pat. Nos. 3,154,872; 3,801,183; 4,082,426; and 4,099,838 have been used as validation stickers for vehicle license plates, and as security films for driver's licenses, government documents, tape cassettes, playing cards, beverage containers, and the like. Other uses include graphics applications for identification purposes such as on police, fire or other emergency vehicles, in advertising and promotional displays and as distinctive labels to provide brand enhancement.

Another form of imaged sheeting is disclosed in U.S. Pat. No. 4,200,875 (Galanos). Galanos discloses the use of a particularly "high-gain retroreflective sheeting of the exposed-lens type," in which images are formed by laser irradiation of the sheeting through a mask or pattern. That sheeting comprises a plurality of transparent glass microspheres partially embedded in a binder layer and partially exposed above the binder layer, with a metal reflective layer coated on the embedded surface of each of the plurality of microspheres. The binder layer contains carbon black, which is said to minimize any stray light that impinges on the sheeting while it is being imaged. The energy of the laser beam is further concentrated by the focusing effect of the microlenses embedded in the binder layer.

The images formed in the retroreflective sheeting of Galanos can be viewed if, and only if, the sheeting is viewed from the same angle at which the laser irradiation was directed at the sheeting. That means, in different terms, that the image is only viewable over a very limited observation angle. For that and other reasons, there has been a desire to improve certain properties of such a sheeting.

As early as 1908, Gabriel Lippman invented a method for producing a true three-dimensional image of a scene in lenticular media having one or more photosensitive layers. That process, known as integral photography, is also described in De Montebello, "Processing and Display of Three-Dimensional Data II" in Proceedings of SPIE, San Diego, 1984. In Lippman's method, a photographic plate is exposed through an array of lenses (or "lenslets"), so that each lenslet of the array transmits a miniature image of the scene being reproduced, as seen from the perspective of the point of the sheet occupied by that lenslet, to the photosensitive layers on a photographic plate. After the photographic plate has been developed, an observer looking at the composite image on the plate through the lenslet array sees a three-dimensional representation of the scene photographed. The image may be in black and white or in color, depending on the photosensitive materials used.

Because the image formed by the lenslets during exposure of the plate has undergone only a single inversion of each miniature image, the three-dimensional representation produced is pseudoscopic. That is, the perceived depth of the image is inverted so that the object appears "inside out." This is a major disadvantage, because to correct the image it is necessary to achieve two optical inversions. These methods are complex, involving multiple exposures with a single camera, or multiple cameras, or multi-lens cameras, to record a plurality of views of the same object, and require extremely accurate registration of multiple images to provide a single three-dimensional image. Further, any method that relies on a conventional camera requires the presence of a real object before the camera. This further renders that method ill-adapted for producing three-dimensional images of a virtual object (meaning an object that exists in effect, but not in fact). A further disadvantage of integral photography is that the composite image must be illuminated from the viewing side to form a real image that may be viewed.

SUMMARY OF THE INVENTION

The present invention provides a microlens sheeting having one or more composite images that appears to be suspended above or below the sheeting. These suspended composite images are referred to for convenience as floating images, and they can appear to be located above or below the sheeting (either as two or three-dimensional images), or can appear as a three-dimensional image that appears above, in the plane of, and below the sheeting. The floating images may also appear to continuously transition from one height or depth to another height or depth. The floating images can be in black and white or in color, and can appear to move with the observer. The floating images can be observed by a viewer with the unaided eye. The term "floating image" may also be used synonymously with the term "virtual image."

The floating images may be formed within the sheeting by illuminating the sheeting with a radiation source, e.g., via an optical train. The energy of the incident light impinging upon the microlens sheeting is focused by the individual microlenses to regions within the sheeting. This focused energy modifies the layer to provide a plurality of individual images, the size, shape, and appearance of which depends on the interaction between the light rays and the microlenses. For example, light rays may form individual images associated with each of the microlenses within the sheeting. The microlenses have refractive surfaces that transmit light to positions within the sheeting to produce one or more composite images from the individual images.

The floating images of the microlens sheeting may include a plurality of composite images presented by (i.e., viewed from) the images formed within the microlens sheeting. The composite images may each be associated with a different viewing angle range, such that the composite images may be viewed from different viewing angles of the sheeting. In some embodiments, different composite images may be presented by the images formed within the sheeting, and those different composite images may have different viewing angle ranges. In this example, two observers positioned at different viewing angles with respect to the sheeting may view different composite images from the sheeting. In another embodiment, the same composite image may be formed over multiple viewing angle ranges. In some cases, the viewing angle ranges may overlap to provide a larger continuous viewing angle range. As a result, the composite image may be viewed from a much larger viewing angle range than is otherwise possible.

The inventive sheeting having composite images as described may be used in a variety of applications such as securing tamperproof images in security documents, passports, identification cards, financial transaction cards (e.g. credit cards), license plates, or other articles. The sheeting may also be used in commercial applications such as automotive applications.

In one embodiment, a method comprises illuminating a sheeting having a surface of microlenses with an energy beam to form a plurality of images within the sheeting, wherein a center of the energy beam is offset from a surface normal of the sheeting, wherein at least one of the images formed within the sheeting is a partially complete image, and wherein the images are associated with different microlenses of the sheeting, wherein the microlenses have refractive surfaces that transmit light to positions within the sheeting to produce one or more composite images from the images formed within the sheeting that appears to float with respect to the surface of the sheeting.

In another embodiment, a sheeting comprises a layer of material having a surface of microlenses that form a plurality of images within the sheeting, wherein at least one of the images formed within the sheeting is a partially complete image, and wherein the images are associated with different microlenses of the sheeting, wherein the microlenses have refractive surfaces that transmit light to positions within the sheeting to produce one or more composite images from the images formed within the sheeting that appears to float with respect to the surface of the sheeting.

In a further embodiment, a system comprises a six-axis robot arm mounted with an optical assembly for imaging a substrate, wherein the six-axis robot arm provides motion within six degrees of freedom, and a controller for controlling the six-axis robot arm to position a radiation source via the optical assembly relative to the substrate.

In yet a further embodiment, a system comprises galvanometer scanner comprising a plurality of mirrors controlled by galvanometers that controls a radiation source so as to produce an energy beam for imaging a substrate, an optical train having an objective for focusing the energy beam, and a controller for controlling the galvanometers to position the energy beam with respect to the optical train.

In another embodiment, an optical assembly for imaging a sheeting to produce a composite image comprises an optical fiber cable for delivering a laser beam, and a plurality of optical objectives to direct the laser beam to a plurality of focal points at a plurality of different angles, wherein the plurality of focal are located at a single position.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The invention will be described herein with reference to the appended drawings, in which:

FIG. 20 is a block diagram illustrating a system configured to utilize an example six-axis robot arm for writing floating images.

DESCRIPTION OF THE PREFERRED EMBODIMENT(S)

The microlens sheeting of the present invention provides a composite image, provided by individual images associated with a number of the microlenses, that appears to be suspended, or to float, above, in the plane of, and/or below the sheeting.

To provide a complete description of the invention, microlens sheetings will be described in Part I below, followed by descriptions of the material layers (preferably radiation sensitive material layers) of such sheetings in Part II, radiation sources in Part III, and the imaging process in Part IV. Several examples are also provided to further explain various embodiments of the present invention.

I. Microlens Sheeting

Figure 1:
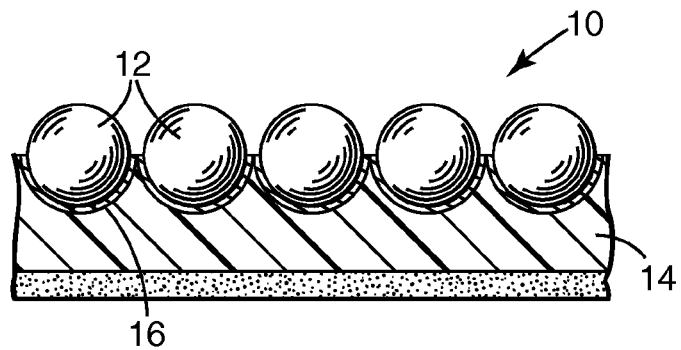
FIG. 1 is an enlarged cross sectional view of an "exposed lens" microlens sheeting.

Microlens sheeting in which the images of this invention can be formed comprise one or more discrete layers of microlenses with a layer of material (preferably a radiation-sensitive material or coating, as described below) disposed adjacent to one side of the microlens layer or layers. For example, FIG. 1 shows an "exposed lens" type of microlens sheeting 10 that includes a monolayer of transparent microspheres 12 that are partially embedded in a binder layer 14, which is typically a polymeric material. The microspheres are transparent both to the wavelengths of radiation that may be used to image the layer of material, as well as to the wavelengths of light in which the composite image will be viewed. The layer of material 16 is disposed at the rear surface of each microsphere, and in the illustrated embodiment typically contacts only a portion of the surface of each of the microspheres 12. This type of sheeting is described in greater detail in U.S. Pat. No. 2,326,634 and is presently available from 3M under the designation Scotchlite 8910 series reflective fabric.

Figure 2:
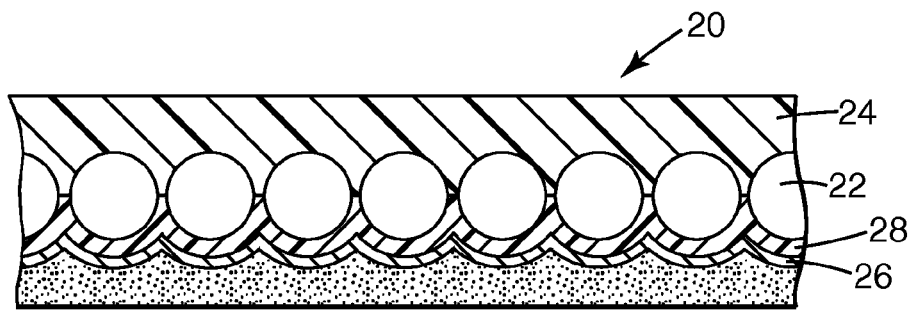
FIG. 2 is an enlarged cross sectional view of an "embedded lens" microlens sheeting.

FIG. 2 shows another suitable type of microlens sheeting. This microlens sheeting 20 is an "embedded-lens" type of sheeting in which the microsphere lenses 22 are embedded in a transparent protective overcoat 24, which is typically a polymeric material. The layer of material 26 is disposed behind the microspheres at the back of a transparent spacer layer 28, which is also typically a polymeric material. This type of sheeting is described in greater detail in U.S. Pat. No. 3,801,183, and is presently available from 3M under the designation Scotchlite 3290 series Engineer grade retroreflective sheeting. Another suitable type of microlens sheeting is referred to as encapsulated lens sheeting, an example of which is described in U.S. Pat. No. 5,064,272, and presently is available from 3M under the designation Scotchlite 3870 series High Intensity grade retroreflective sheeting.

Figure 3:
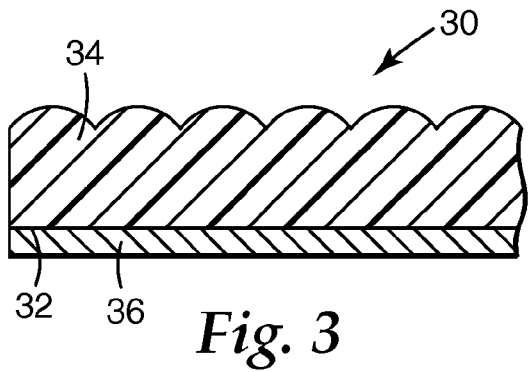
FIG. 3 is an enlarged cross sectional view of a microlens sheeting comprising a plano-convex base sheet.

FIG. 3 shows yet another suitable type of microlens sheeting. This sheeting comprises a transparent plano-convex or aspheric base sheet 30 having first and second broad faces, the second face 32 being substantially planer and the first face having an array of substantially hemi-spheroidal or hemi-aspheroidal microlenses 34. The shape of the microlenses and thickness of the base sheet are selected such that collimated light incident to the array is focused approximately at the second face. The layer of material 36 is provided on the second face. Sheeting of this kind is described in, for example, U.S. Pat. No. 5,254,390, and is presently available from 3M under the designation 2600 series 3M Secure Card receptor.

The microlenses of the sheeting preferably have an image forming refractive surface in order for image formation to occur; generally this is provided by a curved microlens surface. For curved surfaces, the microlens will preferably have a uniform index of refraction. Other useful materials that provide a gradient refractive index (GRIN) will not necessarily need a curved surface to refract light. The microlens surfaces are preferably spherical in nature, but aspherical surfaces are also acceptable. The microlenses may have any symmetry, such as cylindrical or spherical, provided real images are formed by the refraction surfaces. The microlenses themselves can be of discrete form, such as round plano-convex lenslets, round double convex lenslets, rods, microspheres, beads, or cylindrical lenslets. Materials from which the microlenses can be formed include glass, polymers, minerals, crystals, semiconductors and combinations of these and other materials. Non-discrete microlens elements may also be used. Thus, microlenses formed from a replication or embossing process (where the surface of the sheeting is altered in shape to produce a repetitive profile with imaging characteristics) can also be used.

Microlenses with a uniform refractive index of between 1.5 and 3.0 over the ultraviolet, visible, and infrared wavelengths are most useful. Suitable microlens materials will have minimal absorption of visible light, and in embodiments in which an energy source is used to image a radiation-sensitive layer the materials should exhibit minimal absorption of the energy source as well. The refractive power of the microlens, whether the microlens is discrete or replicated, and regardless of the material from which the microlenses are made, is preferably such that the light incident upon the refracting surface will refract and focus on the opposite side of the microlens. More specifically, the light will be focused either on the back surface of the microlens or on the material adjacent to the microlens. In embodiments in which the material layer is radiation sensitive, the microlenses preferably form a demagnified real image at the appropriate position on that layer. Demagnification of the image by approximately 100 to 800 times is particularly useful for forming images that have good resolution. The construction of the microlens sheeting to provide the necessary focusing conditions so that energy incident upon the front surface of the microlens sheeting is focused upon a material layer that is preferably radiation sensitive is described in the U.S. patents referenced earlier in this section.

Microspheres with diameters ranging from 15 micrometers to 275 micrometers are preferable, though other sized microspheres may be used. Good composite image resolution can be obtained by using microspheres having diameters in the smaller end of the aforementioned range for composite images that are to appear to be spaced apart from the microsphere layer by a relatively short distance, and by using larger microspheres for composite images that are to appear to be spaced apart from the microsphere layer by larger distances. Other microlens, such as plano-convex, cylindrical, spherical or aspherical microlenses having lenslet dimensions comparable to those indicated for the microspheres, can be expected to produce similar optical results.

II. Layer of Material

As noted above, a layer of material is provided adjacent to the microlenses. The layer of material may be highly reflective as in some of the microlens sheetings described above, or it may have low reflectivity. When the material is highly reflective, the sheeting may have the property of retroreflectivity as described in U.S. Pat. No. 2,326,634. Individual images formed in the material associated with a plurality of microlenses, when viewed by an observer under reflected or transmitted light, provide a composite image that appears to be suspended, or float, above, in the plane of, and/or below the sheeting. Although other methods may be used, the preferred method for providing such images is to provide a radiation sensitive material as the material layer, and to use radiation to alter that material in a desired manner to provide the image. Thus, although the invention is not limited thereby, the remaining discussion of the layer of material adjacent the microlenses will be provided largely in the context of a radiation sensitive material layer.

Radiation sensitive materials useful for this invention include coatings and films of metallic, polymeric and semi-conducting materials as well as mixtures of these. As used in reference to the present invention, a material is "radiation sensitive" if upon exposure to a given level of visible or other radiation the appearance of the material exposed changes to provide a contrast with material that was not exposed to that radiation. The image created thereby could thus be the result of a compositional change, a removal or ablation of the material, a phase change, or a polymerization of the radiation sensitive coating. Examples of some radiation sensitive metallic film materials include aluminum, silver, copper, gold, titanium, zinc, tin, chromium, vanadium, tantalum, and alloys of these metals. These metals typically provide a contrast due to the difference between the native color of the metal and a modified color of the metal after exposure to the radiation. The image, as noted above, may also be provided by ablation, or by the radiation heating the material until an image is provided by optical modification of the material. U.S. Pat. No. 4,743,526, for example, describes heating a metal alloy to provide a color change.

In addition to metallic alloys, metallic oxides and metallic suboxides can be used as a radiation sensitive medium. Materials in this class include oxide compounds formed from aluminum, iron, copper, tin and chromium. Non-metallic materials such as zinc sulfide, zinc selenide, silicon dioxide, indium tin oxide, zinc oxide, magnesium fluoride and silicon can also provide a color or contrast that is useful for this invention.

Multiple layers of thin film materials can also be used to provide unique radiation sensitive materials. These multi-layer materials can be configured to provide a contrast change by the appearance or removal of a color or contrast agent. Exemplary constructions include optical stacks or tuned cavities that are designed to be imaged (by a change in color, for example) by specific wavelengths of radiation. One specific example is described in U.S. Pat. No. 3,801,183, which discloses the use of cryolite/zinc sulphide ($Na_3AlF_6$/ZnS) as a dielectric mirror. Another example is an optical stack composed of chromium/polymer (such as plasma polymerized butadiene)/silicon dioxide/aluminum where the thickness of the layers are in the ranges of 4 nm for chromium, between 20 nm and 60 nm for the polymer, between 20 nm and 60 nm for the silicon dioxide, and between 80 nm and 100 nm for the aluminum, and where the individual layer thicknesses are selected to provide specific color reflectivity in the visible spectrum. Thin film tuned cavities could be used with any of the single layer thin films previously discussed. For example, a tuned cavity with an approximately 4 nm thick layer of chromium and the silicon dioxide layer of between about 100 nm and 300 nm, with the thickness of the silicon dioxide layer being adjusted to provide a colored imaged in response to specific wavelengths of radiation.

Radiation sensitive materials useful for this invention also include thermochromic materials. "Thermochromic" describes a material that changes color when exposed to a change in temperature. Examples of thermochromic materials useful in this invention are described in U.S. Pat. No. 4,424,990, and include copper carbonate, copper nitrate with thiourea, and copper carbonate with sulfur containing compounds such as thiols, thioethers, sulfoxides, and sulfones. Examples of other suitable thermochromic compounds are described in U.S. Pat. No. 4,121,011, including hydrated sulfates and nitrides of boron, aluminum, and bismuth, and the oxides and hydrated oxides of boron, iron, and phosphorus.

Naturally, if the material layer is not going to be imaged using a source of radiation, then the material layer can, but is not required to, be radiation sensitive. Radiation sensitive materials are preferred for ease of manufacturing, however, and thus a suitable radiation source is preferably also used.

III. Radiation Sources

As noted above, a preferred manner of providing the image patterns on the layer of material adjacent the microlenses is to use a radiation source to image a radiation sensitive material. Any energy source providing radiation of the desired intensity and wavelength can be used with the method of the present invention. Devices capable of providing radiation having a wavelength of between 200 nm and 11 micrometers are believed to be particularly preferred. Examples of high peak power radiation sources useful for this invention include excimer flashlamps, passively Q-switched microchip lasers, and Q-switched Neodymium doped-yttrium aluminum garnet (abbreviated Nd:YAG), Neodymium doped-yttrium lithium fluoride (abbreviated Nd:YLF) and Titanium doped-sapphire (abbreviated Ti:sapphire) lasers. These high peak power sources are most useful with radiation sensitive materials that form images through ablation—the removal of material or in multiphoton absorption processes. Other examples of useful radiation sources include devices that give low peak power such as laser diodes, ion lasers, non Q-switched solid state lasers, metal vapor lasers, gas lasers, arc lamps and high power incandescent light sources. These sources are particularly useful when the radiation sensitive medium is imaged by a non-ablative method.

Figure 14:
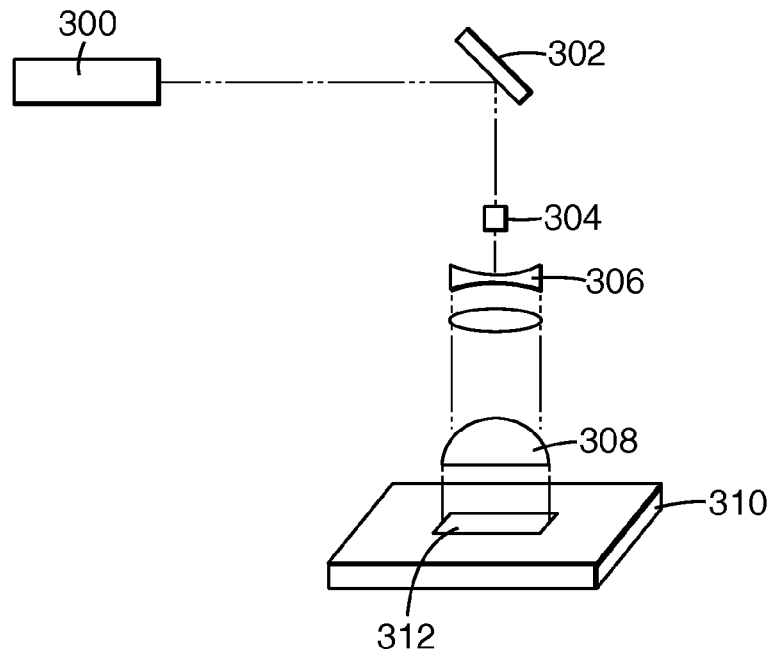
FIG. 14 is a depiction of an optical train for creating the divergent energy used to form the composite images of this invention.
Figure 15:
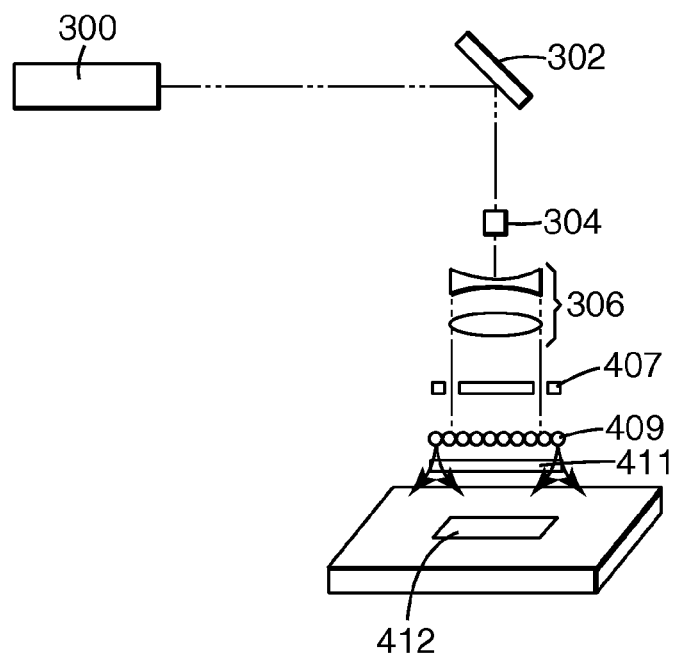
FIG. 15 is a depiction of a second optical train for creating the divergent energy used to form the composite images of this invention.
Figure 16:
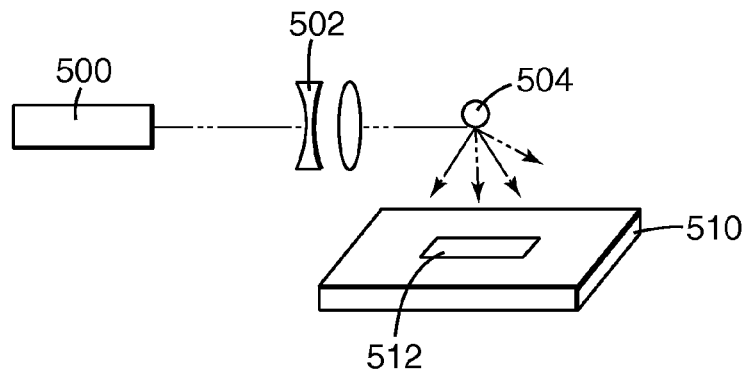
FIG. 16 is a depiction of a third optical train for creating the divergent energy used to form the composite images of this invention.

For all useful radiation sources, the energy from the radiation source is directed toward the microlens sheeting material and controlled to give a highly divergent beam of energy. For energy sources in the ultraviolet, visible, and infrared portions of the electromagnetic spectrum, the light is controlled by appropriate optical elements, examples of which are shown in FIGS. 14, 15, and 16 and described in greater detail below. In one embodiment, a requirement of this arrangement of optical elements, commonly referred to as an optical train, is that the optical train direct light toward the sheeting material with appropriate divergence or spread so as to irradiate the microlens and thus the material layer at the desired angles. The composite images of the present invention are preferably obtained by using light spreading devices with numerical apertures (defined as the sine of the half angle of the maximum diverging rays) of greater than or equal to 0.3. Light spreading devices with larger numerical apertures produce composite images having a greater viewing angle, and a greater range of apparent movement of the image.

IV. Imaging Process

An exemplary imaging process according to this invention consists of directing collimated light from a laser through a lens toward the microlens sheeting. To create a sheeting having a floating image, as described further below, the light is transmitted through a diverging lens with a high numerical aperture (NA) to produce a cone of highly divergent light. A high NA lens is a lens with a NA equal to or greater than 0.3. The radiation sensitive coating side of the microspheres is positioned away from the lens, so that the axis of the cone of light (the optical axis) is perpendicular to the plane of the microlens sheeting.

Because each individual microlens occupies a unique position relative to the optical axis, the light impinging on each microlens will have a unique angle of incidence relative to the light incident on each other microlens. Thus, the light will be transmitted by each microlens to a unique position on the material layer, and produce a unique image. More precisely, a single light pulse produces only a single imaged dot on the material layer, so to provide an image adjacent each microlens, multiple pulses of light are used to create that image out of multiple imaged dots. For each pulse, the optical axis is located at a new position relative to the position of the optical axis during the previous pulse. These successive changes in the position of the optical axis relative to the microlenses results in a corresponding change in the angle of incidence upon each microlens, and accordingly in the position of the imaged dot created in the material layer by that pulse. As a result, the incident light focusing on the backside of the microsphere images a selected pattern in the radiation sensitive layer. Because the position of each microsphere is unique relative to every optical axis, the image formed in the radiation sensitive material for each microsphere will be different from the image associated with every other microsphere.

Another method for forming floating composite images uses a lens array to produce the highly divergent light to image the microlensed material. The lens array consists of multiple small lenses all with high numerical apertures arranged in a planar geometry. When the array is illuminated by a light source, the array will produce multiple cones of highly divergent light, each individual cone being centered upon its corresponding lens in the array. The physical dimensions of the array are chosen to accommodate the largest lateral size of a composite image. By virtue of the size of the array, the individual cones of energy formed by the lenslets will expose the microlensed material as if an individual lens was positioned sequentially at all points of the array while receiving pulses of light. The selection of which lenses receive the incident light occurs by the use of a reflective mask. This mask will have transparent areas corresponding to sections of the composite image that are to be exposed and reflective areas where the image should not be exposed. Due to the lateral extent of the lens array, it is not necessary to use multiple light pulses to trace out the image.

By having the mask fully illuminated by the incident energy, the portions of the mask that allow energy to pass through will form many individual cones of highly divergent light outlining the floating image as if the image was traced out by a single lens. As a result, only a single light pulse is needed to form the entire composite image in the microlens sheeting. Alternatively, in place of a reflective mask, a beam positioning system, such as a galvanometer xy scanner, can be used to locally illuminate the lens array and trace the composite image on the array. Since the energy is spatially localized with this technique, only a few lenslets in the array are illuminated at any given time. Those lenslets that are illuminated will provide the cones of highly diverging light needed to expose the microlensed material to form the composite image in the sheetings.

The lens array itself can be fabricated from discrete lenslets or by an etching process to produce a monolithic array of lenses. Materials suitable for the lenses are those that are non-absorbing at the wavelength of the incident energy. The individual lenses in the array preferably have numerical apertures greater than 0.3 and diameters greater than 30 micrometers but less than 10 mm. These arrays may have antireflection coatings to reduce the effects of back reflections that may cause internal damage to the lens material. In addition, single lenses with an effective negative focal length and dimensions equivalent to the lens array may also be used to increase the divergence of the light leaving the array. Shapes of the individual lenslets in a monolithic array are chosen to have a high numerical aperture and provide a large fill factor of approximately greater than 60%.

Figure 4:
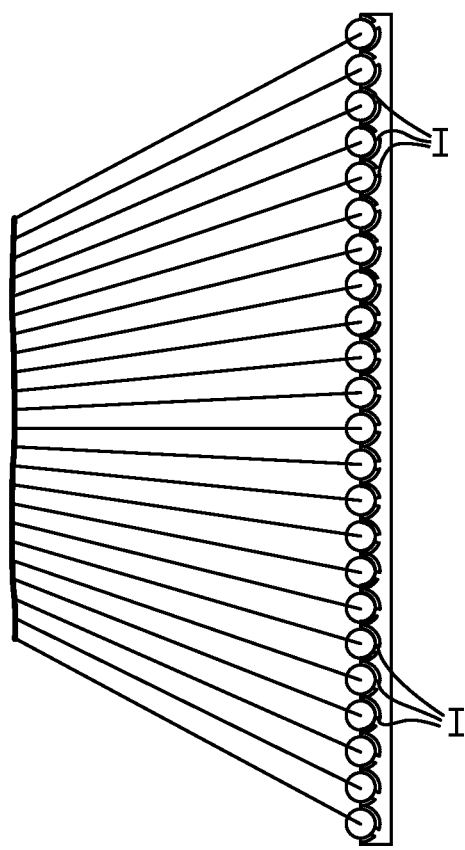
FIG. 4 is a graphical representation of divergent energy impinging on a microlens sheeting constructed of microspheres.

FIG. 4 is a graphical schematic representation of divergent energy impinging on a microlens sheeting. The portion of the material layer on or in which an image I is formed is different for each microlens, because each microlense "sees" the incoming energy from a different perspective. Thus, a unique image is formed in the material layer associated with each microlens.

Figure 5:
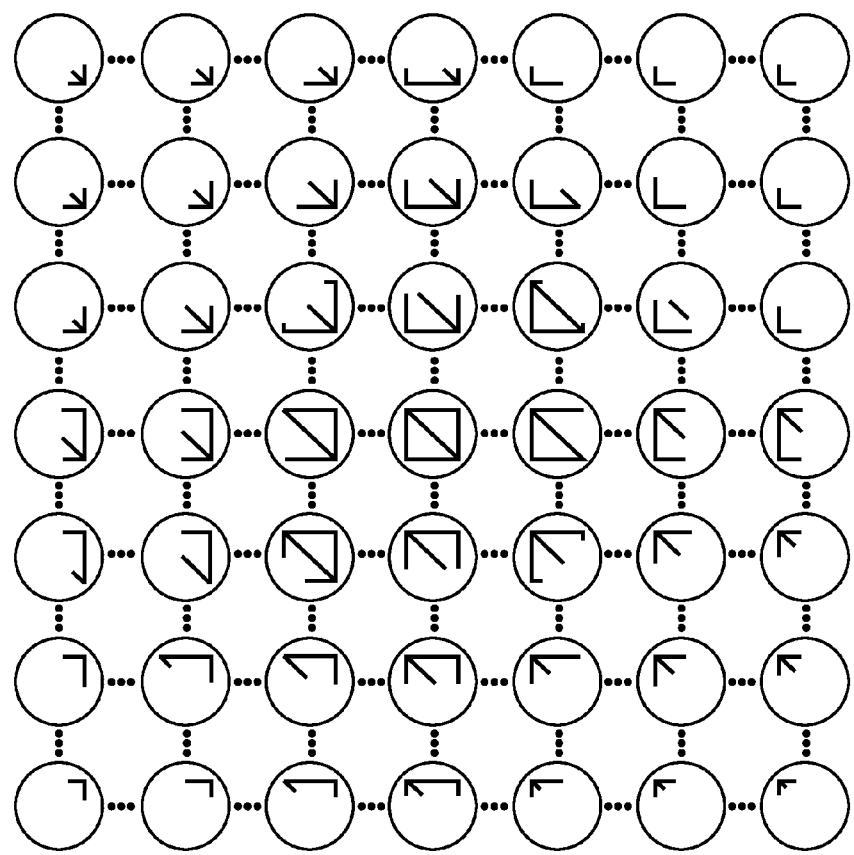
FIG. 5 is a plan view of a section of a microlens sheeting depicting sample images recorded in the material layer adjacent individual microspheres, and further showing that the recorded images range from complete replication to partial replication of the composite image.
Figure 6:
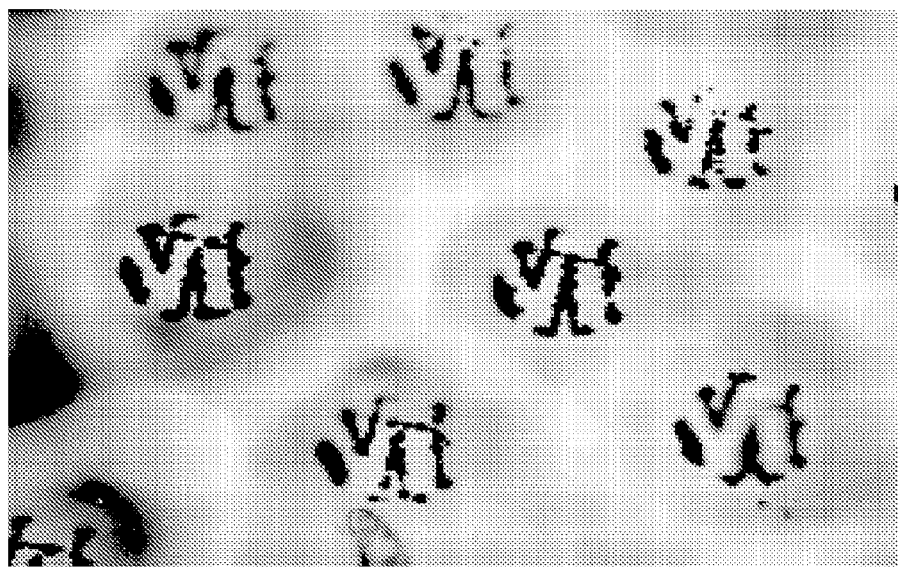
FIG. 6 is an optical micrograph of a microlens sheeting with a radiation sensitive material layer made of aluminum film that has been imaged to provide a composite image that appears to float above the sheeting in accordance with the present invention.
Figure 7:
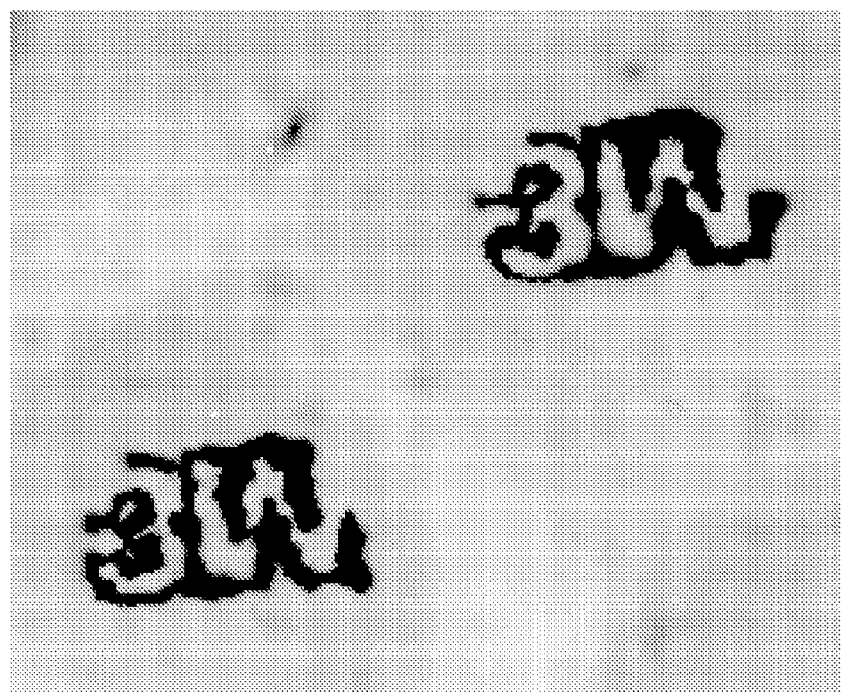
FIG. 7 is an optical micrograph of a microlens sheeting with a radiation sensitive material layer made of aluminum film that has been imaged to provide a composite image that appears to float below the sheeting in accordance with the present invention.

After imaging, depending upon the size of the extended object, a full or partial image of the object will be present in the radiation sensitive material behind each microsphere. The extent to which the actual object is reproduced as an image behind a microsphere depends on the energy density incident upon the microsphere. Portions of an extended object may be distant enough from a region of microlenses that the energy incident upon those microspheres has an energy density lower than the level of radiation required to modify that material. Moreover, for a spatially extended image, when imaging with a fixed NA lens, not all portions of the sheeting will be exposed to the incident radiation for all parts of the extended object. As a result, those portions of the object will not be modified in the radiation sensitive medium and only a partial image of the object will appear behind the microspheres. FIG. 5 is a perspective view of a section of a microlens sheeting depicting sample images formed in the radiation sensitive layer adjacent to individual microspheres, and further showing that the recorded images range from complete replication to partial replication of the composite image. FIGS. 6 and 7 are optical micrographs of a microlens sheeting imaged according to this invention, in which the radiation sensitive layer is an aluminum layer. As shown therein some of the images are complete, and others are partial.

These composite images can also be thought of as the result of the summing together of many images, both partial and complete, all with different perspectives of a real object. The many unique images are formed through an array of miniature lenses, all of which "see" the object or image from a different vantage point. Behind the individual miniature lenses, a perspective of the image is created in the material layer that depends on the shape of the image and the direction from which the imaging energy source was received. However, not everything that the lens sees is recorded in the radiation sensitive material. Only that portion of the image or object seen by the lens that has sufficient energy to modify the radiation sensitive material will be recorded.

The "object" to be imaged is formed through the use of an intense light source by either tracing the outline of the "object" or by the use of a mask. For the image thus recorded to have a composite aspect, the light from the object must radiate over a broad range of angles. When the light radiating from an object is coming from a single point of the object and is radiating over a broad range of angles, all the light rays are carrying information about the object, but only from that single point, though the information is from the perspective of the angle of the light ray. Now consider that in order to have relatively complete information about the object, as carried by the light rays, light must radiate over a broad range of angles from the collection of points that constitute the object. In this invention, the range of angles of the light rays emanating from an object is controlled by optical elements interposed between the object and the microlens material. These optical elements are chosen to give the optimum range of angles necessary to produce a composite image. The best selection of optical elements results in a cone of light whereby the vertex of the cone terminates at the position of the object. Optimum cone angles are greater than about 40 degrees.

The object is demagnified by the miniature lenses and the light from the object is focused onto the energy sensitive coating against the backside of the miniature lens. The actual position of the focused spot or image at the backside of the lens depends upon the direction of the incident light rays originating from the object. Each cone of light emanating from a point on the object illuminates a fraction of the miniature lenses and only those miniature lenses illuminated with sufficient energy will record a permanent image of that point of the object.

Geometrical optics will be used to describe the formation of various composite images according to the present invention. As noted previously, the imaging processes described below are preferred, but not exclusive, embodiments of the invention.

A. Creating a Composite Image that Floats Above the Sheeting

Figure 8:
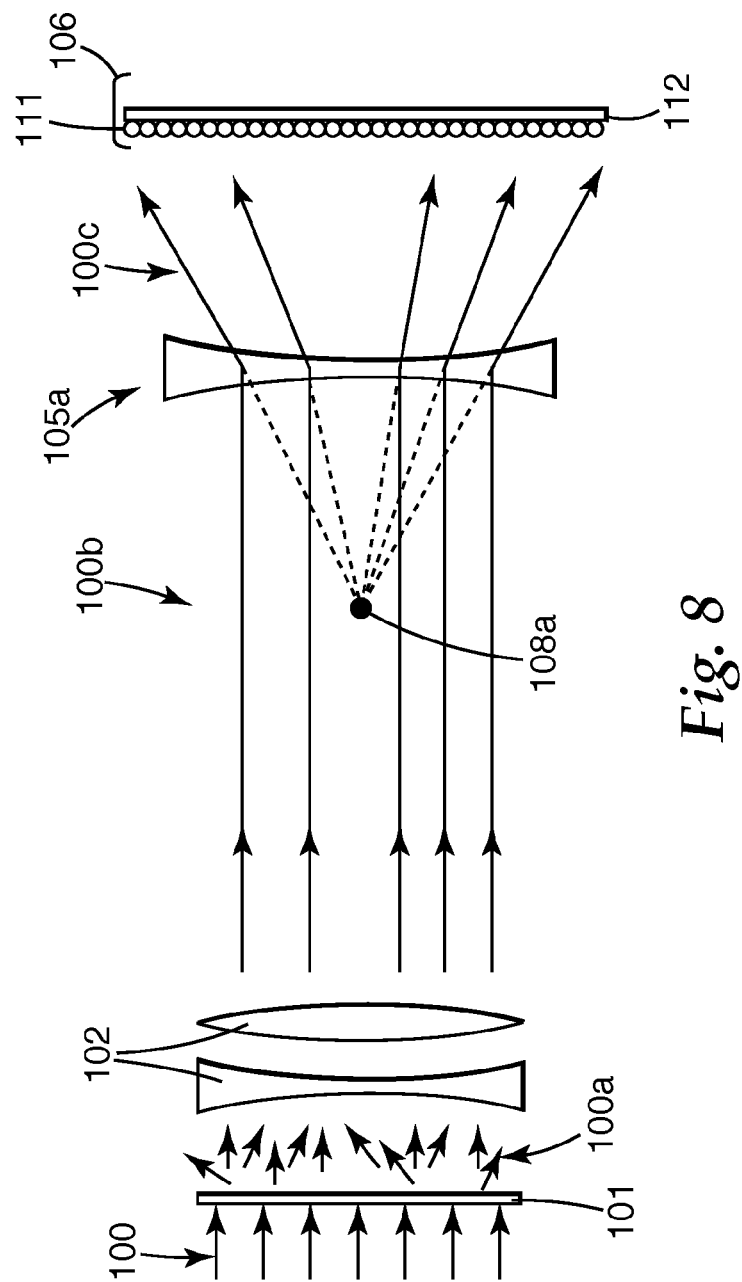
FIG. 8 is a geometrical optical representation of the formation of a composite image that appears to float above the microlens sheeting.

Referring to FIG. 8, incident energy 100 (light, in this example) is directed onto a light diffuser 101 to homogenize any non-uniformities in the light source. The diffusely scattered light 100a is captured and collimated by a light collimator 102 that directs the uniformly distributed light 100b towards a diverging lens 105a. From the diverging lens, the light rays 100c diverge toward the microlens sheeting 106.

The energy of the light rays impinging upon the microlens sheeting 106 is focused by the individual microlenses 111 onto the material layer (a radiation sensitive coating 112, in the illustrated embodiment). This focused energy modifies the radiation sensitive coating 112 to provide an image, the size, shape, and appearance of which depends on the interaction between the light rays and the radiation sensitive coating.

The arrangement shown in FIG. 8 would provide a sheeting having a composite image that appears to an observer to float above the sheeting as described below, because diverging rays 100c, if extended backward through the lens, would intersect at the focal point 108a of the diverging lens. Stated differently, if a hypothetical "image ray" were traced from the material layer through each of the microspheres and back through the diverging lens, they would meet at 108a, which is where the composite image appears.

B. Viewing a Composite Image that Floats Above the Sheeting

Figure 9:
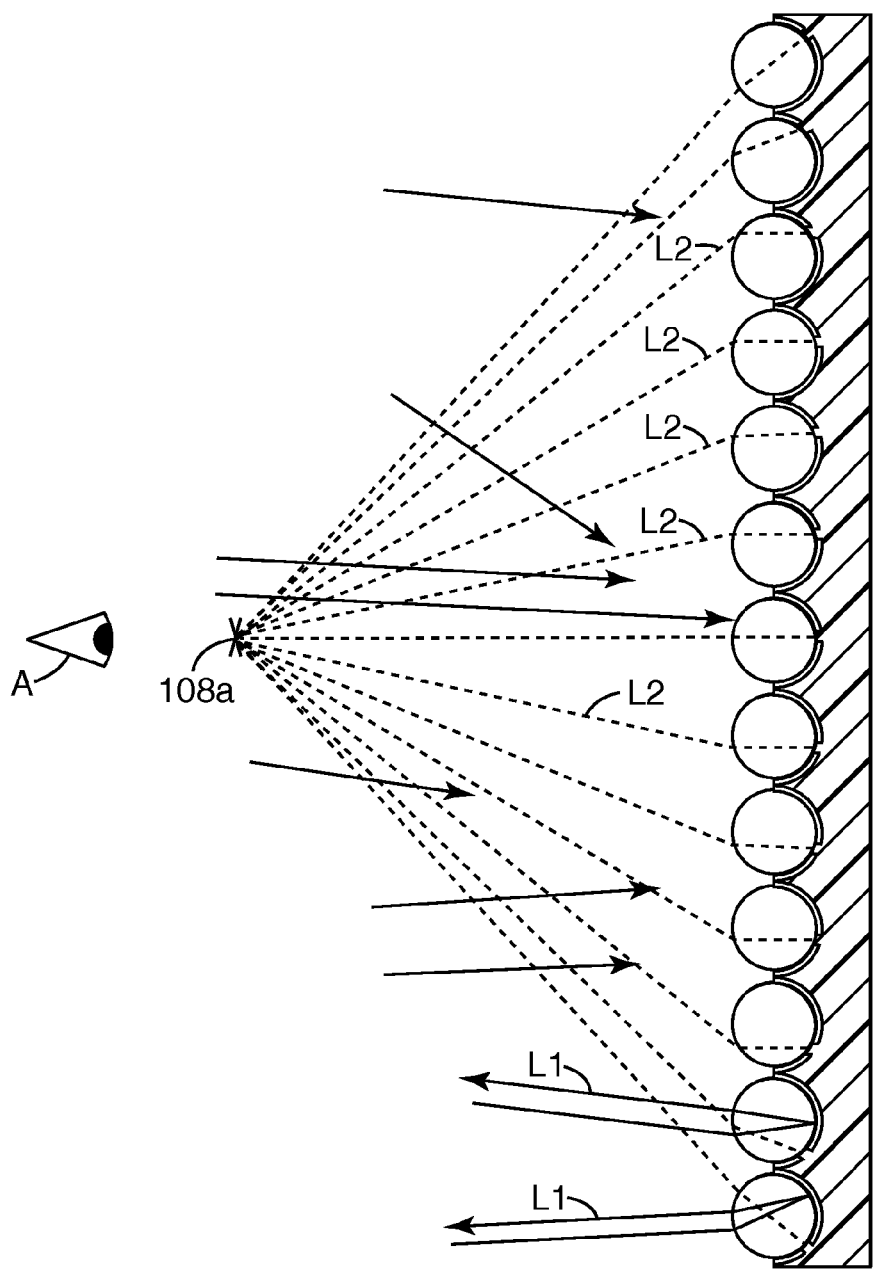
FIG. 9 is a schematic representation of a sheeting having a composite image that appears to float above the inventive sheeting when the sheeting is viewed in reflected light.

A sheeting that has a composite image may be viewed using light that impinges on the sheeting from the same side as the observer (reflected light), or from the opposite side of the sheeting as the observer (transmitted light), or both. FIG. 9 is a schematic representation of a composite image that appears to the unaided eye of an observer A to float above the sheeting when viewed under reflected light. An unaided eye may be corrected to normal vision, but is not otherwise assisted by, for example, magnification or a special viewer. When the imaged sheeting is illuminated by reflected light, which may be collimated or diffuse, light rays are reflected back from the imaged sheeting in a manner determined by the material layer struck by the light rays. By definition, the images formed in the material layer appear different than the non-imaged portions of the material layer, and thus an image can be perceived.

For example, light L1 may be reflected by the material layer back toward the observer. However, the material layer may not reflect light L2 back toward the observer well, or at all, from the imaged portions thereof. Thus, the observer may detect the absence of light rays at 108a, the summation of which creates a composite image that appears to float above the sheeting at 108a. In short, light may be reflected from the entire sheeting except the imaged portions, which means that a relatively dark composite image will be apparent at 108a.

It is also possible that the nonimaged material would absorb or transmit incident light, and that the imaged material would reflect or partially absorb incident light, respectively, to provide the contrast effect required to provide a composite image. The composite image under those circumstances would appear as a relatively bright composite image in comparison to the remainder of the sheeting, which would appear relatively dark. This composite image may be referred to as a "real image" because it is actual light, and not the absence of light, that creates the image at focal point 108a. Various combinations of these possibilities can be selected as desired.

Figure 10:
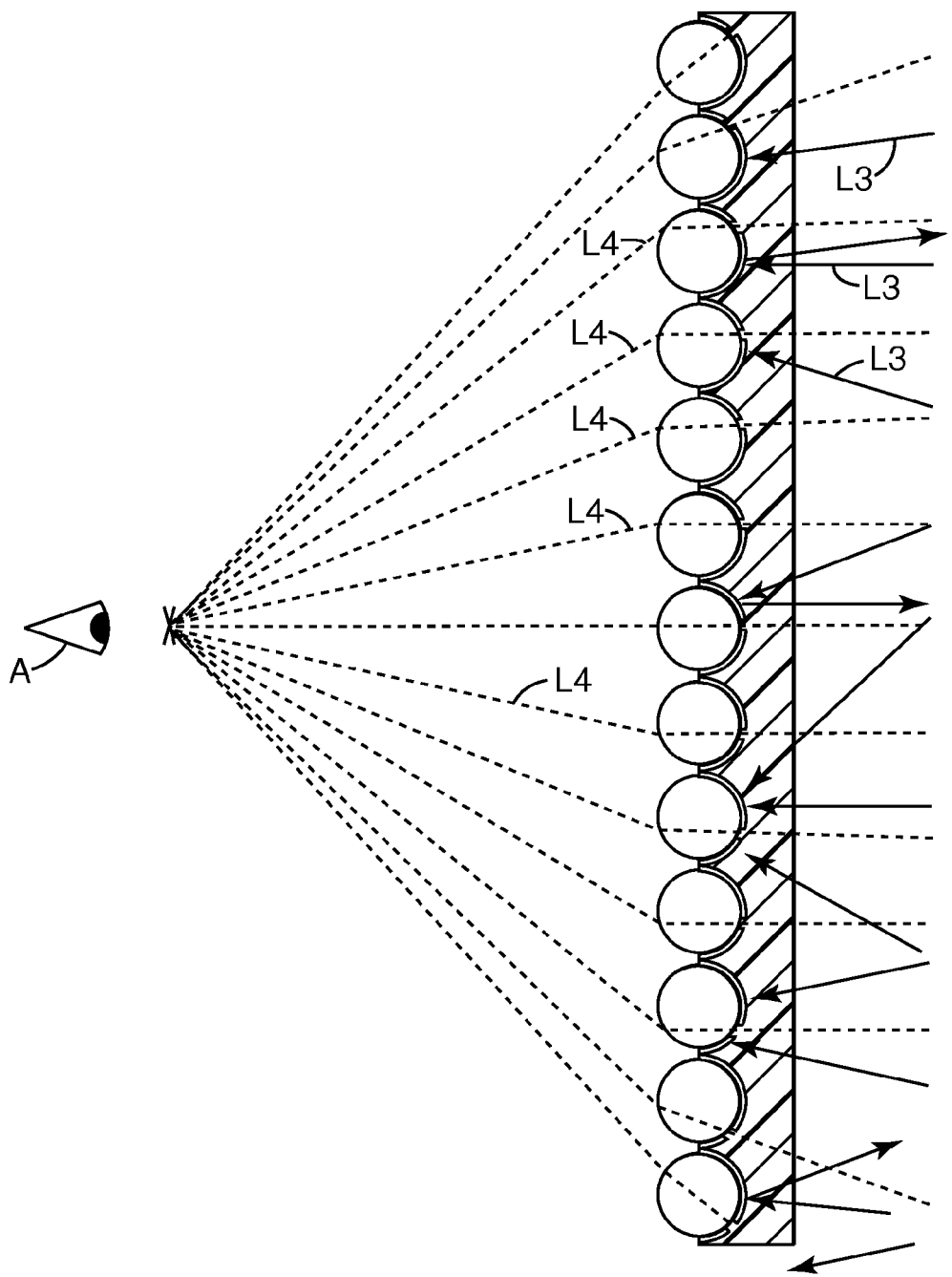
FIG. 10 is a schematic representation of a sheeting having a composite image that appears to float above the inventive sheeting when the sheeting is viewed in transmitted light.

Certain imaged sheetings can also be viewed by transmitted light, as shown in FIG. 10. For example, when the imaged portions of the material layer are translucent and the nonimaged portions are not, then most light L3 will be absorbed or reflected by the material layer, while transmitted light L4 will be passed through the imaged portions of the material layer and directed by the microlenses toward the focal point 108a. The composite image will be apparent at the focal point, where it will in this example appear brighter than the remainder of the sheeting. This composite image may be referred to as a "real image" because it is actual light, and not the absence of light, that creates the image at focal point 108a.

Alternatively, if the imaged portions of the material layer are not translucent but the remainder of the material layer is, then the absence of transmitted light in the areas of the images will provide a composite image that appears darker than the remainder of the sheeting.

C. Creating a Composite Image that Floats Below the Sheeting

Figure 11:
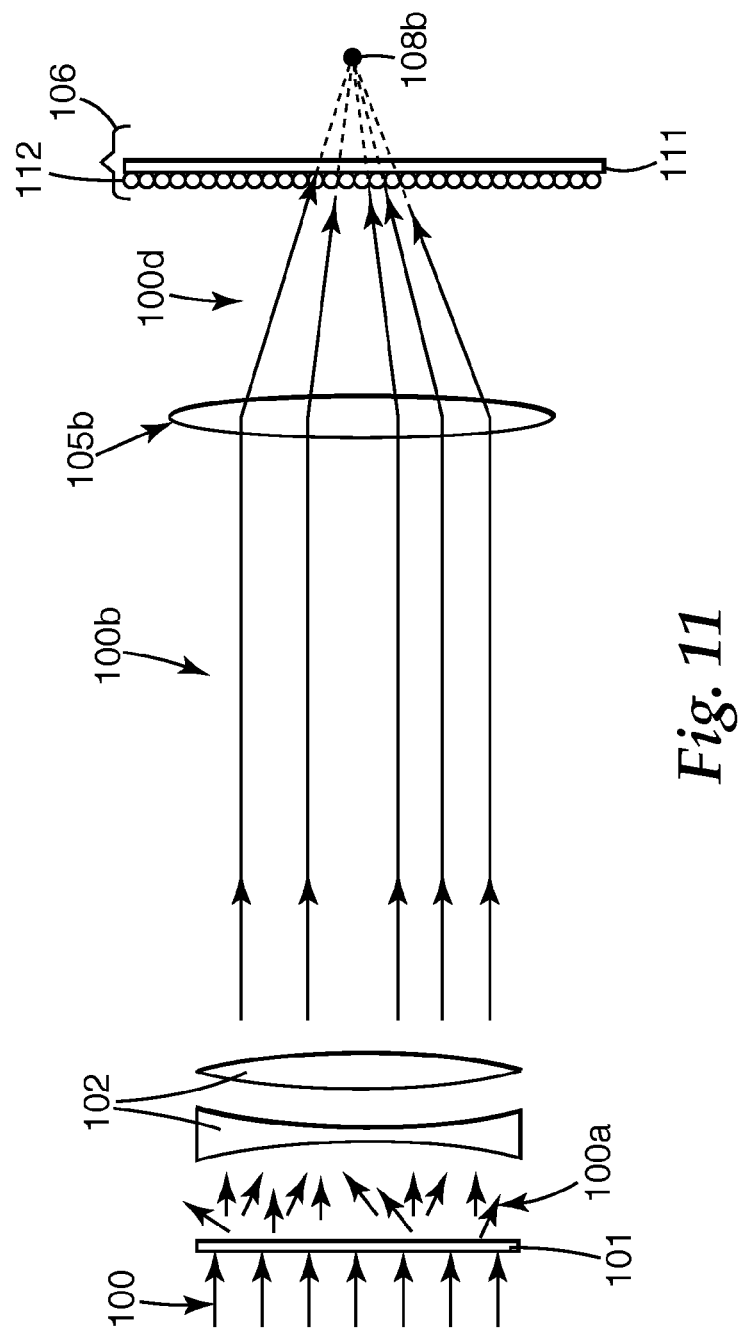
FIG. 11 is a geometrical optical representation of the formation of a composite image that when viewed will appear to float below the microlens sheeting.

A composite image may also be provided that appears to be suspended on the opposite side of the sheeting from the observer. This floating image that floats below the sheeting can be created by using a converging lens instead of the diverging lens 105 shown in FIG. 8. Referring to FIG. 11, the incident energy 100 (light, in this example) is directed onto a diffuser 101 to homogenize any non-uniformities in the light source. The diffuse light 100a is then collected and collimated in a collimator 102 that directs the light 100b toward a converging lens 105b. From the converging lens, the light rays 100d are incident on the microlens sheeting 106, which is placed between the converging lens and the focal point 108b of the converging lens.

The energy of the light rays impinging upon the microlens sheeting 106 is focused by the individual microlenses 111 onto the material layer (a radiation sensitive coating 112, in the illustrated embodiment). This focused energy modifies the radiation sensitive coating 112 to provide an image, the size, shape, and appearance of which depends on the interaction between the light rays and the radiation sensitive coating.

The arrangement shown in FIG. 11 would provide a sheeting having a composite image that appears to an observer to float below the sheeting as described below, because converging rays 100d, if extended through the sheeting, would intersect at the focal point 108b of the diverging lens. Stated differently, if a hypothetical "image ray" were traced from the converging lens 105b through each of the microspheres and through the images in the material layer associated with each microlens, they would meet at 108b, which is where the composite image appears.

D. Viewing a Composite Image that Floats Below the Sheeting

Figure 12:
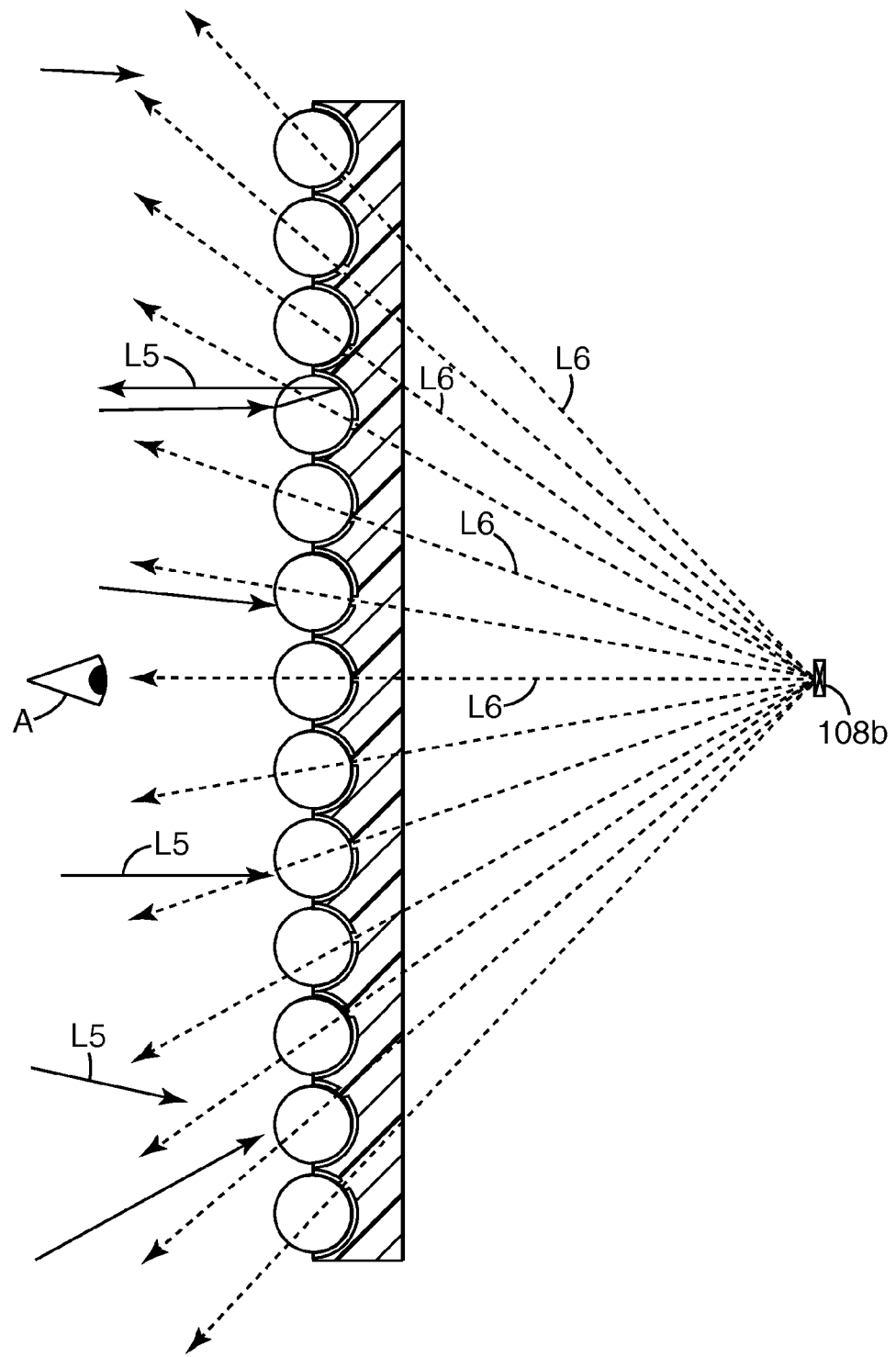
FIG. 12 is a schematic representation of a sheeting having a composite image that appears to float below the inventive sheeting when the sheeting is viewed in reflected light.

Sheeting having a composite image that appears to float below the sheeting can also be viewed in reflected light, transmitted light, or both. FIG. 12 is a schematic representation of a composite image that appears to float below the sheeting when viewed under reflected light. For example, light L5 may be reflected by the material layer back toward the observer. However, the material layer may not reflect light L6 back toward the observer well, or at all, from the imaged portions thereof. Thus, the observer may detect the absence of light rays at 108b, the summation of which creates a composite image that appears to float below the sheeting at 108b. In short, light may be reflected from the entire sheeting except the imaged portions, which means that a relatively dark composite image will be apparent at 108b.

It is also possible that the nonimaged material would absorb or transmit incident light, and that the imaged material would reflect or partially absorb incident light, respectively, to provide the contrast effect required to provide a composite image. The composite image under those circumstances would appear as a relatively bright composite image in comparison to the remainder of the sheeting, which would appear relatively dark. Various combinations of these possibilities can be selected as desired.

Figure 13:
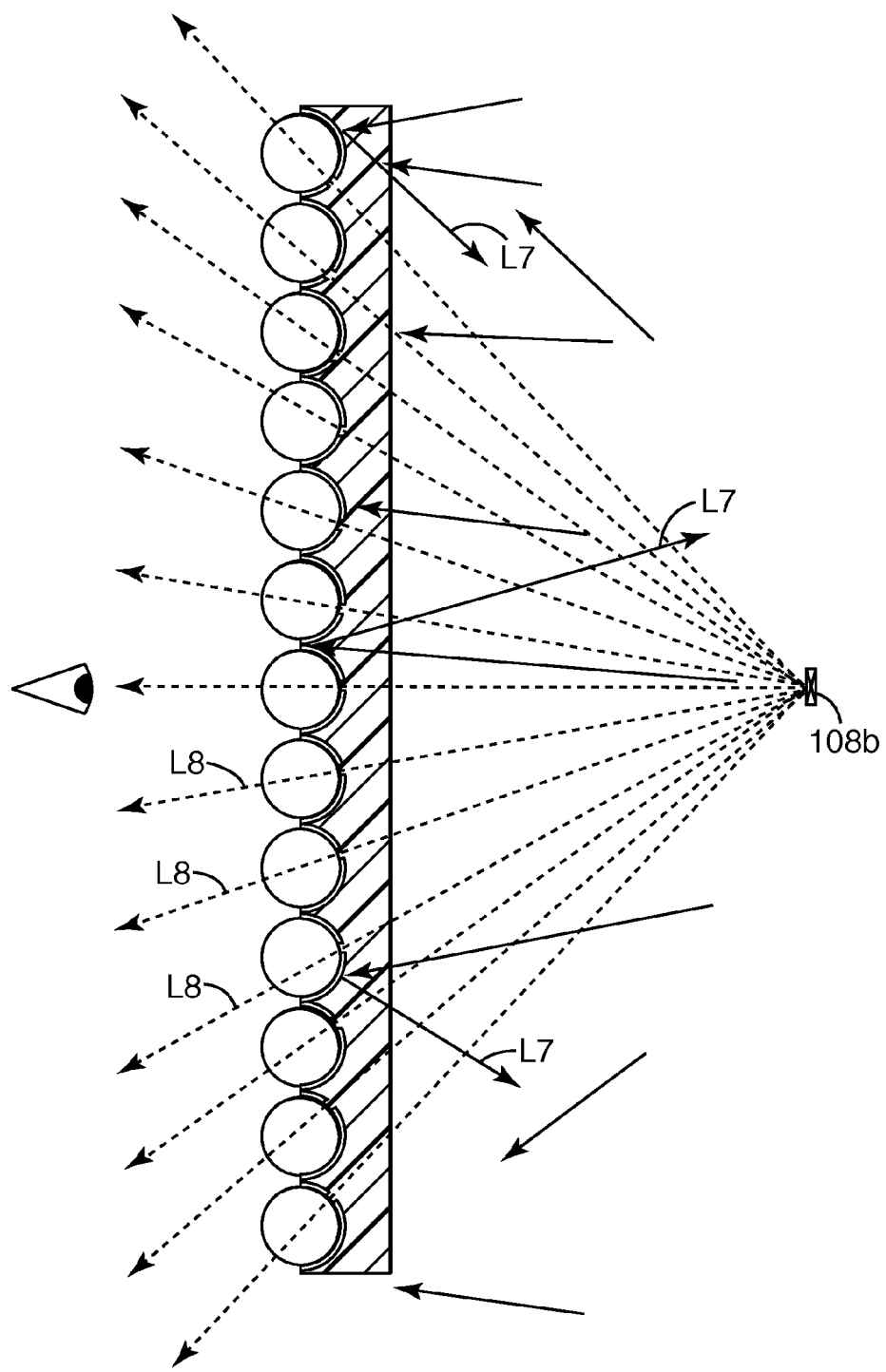
FIG. 13 is a schematic representation of a sheeting having a composite image that appears to float below the inventive sheeting when the sheeting is viewed in transmitted light.

Certain imaged sheetings can also be viewed by transmitted light, as shown in FIG. 13. For example, when the imaged portions of the material layer are translucent and the nonimaged portions are not, then most light L7 will be absorbed or reflected by the material layer, while transmitted light L8 will be passed through the imaged portions of the material layer. The extension of those rays, referred to herein as "image rays," back in the direction of the incident light results in the formation of a composite image at 108b. The composite image will be apparent at the focal point, where it will in this example appear brighter than the remainder of the sheeting.

Alternatively, if the imaged portions of the material layer are not translucent but the remainder of the material layer is, then the absence of transmitted light in the areas of the images will provide a composite image that appears darker than the remainder of the sheeting.

E. Complex Images

Composite images made in accordance with the principles of the present invention may appear to be either two-dimensional, meaning that they have a length and width, and appear either below, or in the plane of, or above the sheeting, or three-dimensional, meaning that they have a length, width, and height. Three-dimensional composite images may appear below or above the sheeting only, or in any combination of below, in the plane of, and above the sheeting, as desired. The term "in the plane of the sheeting" refers only generally to the plane of the sheeting when the sheeting is laid flat. That is, sheeting that isn't flat can also have composite images that appear to be at least in part "in the plane of the sheeting" as that phrase is used herein.

Three-dimensional composite images do not appear at a single focal point, but rather as a composite of images having a continuum of focal points, with the focal points ranging from one side of the sheeting to or through the sheeting to a point on the other side. This is preferably achieved by sequentially moving either the sheeting or the energy source relative to the other (rather than by providing multiple different lenses) so as to image the material layer at multiple focal points. The resulting spatially complex image essentially consists of many individual dots. This image can have a spatial extent in any of the three cartesian coordinates relative to the plane of the sheeting.

In another type of effect, a composite image can be made to move into a region of the microlensed sheeting where it disappears. This type of image is fabricated in a fashion similar to the levitation examples with the addition of placing an opaque mask in contact with the microlensed materials to partially block the imaging light for part of the microlensed material. When viewing such an image, the image can be made to move into the region where the imaging light was either reduced or eliminated by the contact mask. The image seems to "disappear" in that region.

The composite images formed according to the present invention can have very wide viewing angles, meaning that an observer can see the composite image across a wide range of angles between the plane of the sheeting and the viewing axis. Composite images formed in microlens sheeting comprised of a monolayer of glass microspheres having an average diameter of approximately 70-80 micrometers and, when using an aspheric lens with a numerical aperture of 0.64, are visible within a conical field of view whose central axis is determined by the optical axis of the incident energy. Under ambient lighting, the composite image so formed is viewable across a cone of about 80-90 degrees full angle. Utilizing an imaging lens with less divergence or lower NA can form smaller half angle cones.

Images formed by the process of this invention can also be constructed that have a restricted viewing angle. In other words, the image would only be seen if viewed from a particular direction, or minor angular variations of that direction. Such images are formed similar to the method described in Example One below, except that light incident on the final aspheric lens is adjusted so that only a portion of the lens is illuminated by the laser radiation. The partial filling of the lens with incident energy results in a restricted cone of divergent light incident upon the microlensed sheeting. For aluminum coated microlens sheeting, the composite image appears only within a restricted viewing cone as a dark gray image on a light gray background. The image appears to be floating relative to the microlens sheeting.

EXAMPLES

This invention will be further explained by the following Examples, which may for convenience reference certain of the Figures.

Example One

This example describes an embedded lens sheeting with an aluminum material layer, and a composite image that appeared to float above the sheeting. An optical train of the type depicted in FIG. 14 was used to form the floating image. The optical train consisted of a Spectra Physics Quanta-Ray™ DCR-2(10) Nd:YAG laser 300 operating in a Q-switched mode at its fundamental wavelength of 1.06 micrometers. The pulse width of this laser is typically from 10-30 ns. Following the laser, the energy was redirected by a 99% reflective turning mirror 302, a ground glass diffuser 304, a 5× beam expansion telescope 306, and an aspheric lens 308 with a numerical aperture of 0.64 and a focal length of 39.0 mm. The light from the aspheric lens 308 was directed toward an XYZ stage 310. The stage was composed of three linear stages, and is available from Aerotech Inc. of Pittsburgh, Pa. under the designation ATS50060. One linear stage was used to move the aspheric lens along the axis between the aspheric focal point and the microlens sheeting (the z-axis), and the other two stages enabled the sheeting to be moved in two mutually orthogonal horizontal axes relative to the optical axis.

The laser light was directed toward the ground glass diffuser 304 to eliminate any beam inhomogeneities caused by thermal lensing. Immediately adjacent to the diffuser, a 5× beam expansion telescope 306 collimated the diverging light from the diffuser and enlarged the light beam to fill the aspherical lens 308.

In this example, the aspheric lens was positioned above the XY plane of the XYZ stage so that the focal point of the lens was 1 cm above the microlens sheeting 312. An apertured energy meter available from Gentec, Inc., of Saint-Fey, Quebec, Canada under the designation ED500 with a mechanical mask, was used to control the energy density at the plane of the sheeting. The laser output was adjusted to obtain approximately 8 milliJoules per square centimeter (8 mJ/cm$^2$) over the illuminated area of the energy meter 1 cm from the focal point of the aspheric lens. A sample of embedded lens sheeting 312 with an 80 nm thick aluminum radiation sensitive layer was affixed to the XYZ stage 310 so that the aluminum coated side faced away from the aspherical lens 308.

A controller available from Aerotech, Inc. of Pittsburgh, Pa. under the designation U21 provided the necessary control signals for movement of the XYZ stage 312 and control voltages for pulsing of the laser 300. The stages were moved by importing a CAD file into the controller with the x-y-z coordinate information, movement commands, and laser firing commands necessary to produce the image. An arbitrary complex composite image was formed by coordinating the movement of the X, Y and Z stages with the pulsing of the laser to trace the image in space above the microlensed material. The stage speed was adjusted to 50.8 centimeters/minute for a laser pulse rate of 10 Hz. This formed continuous composite lines in the aluminum layer adjacent the microlenses.

When the microlensed sheeting was viewed in ambient light, the images were dark gray against a light gray background. For a fixed 1 cm spacing between the focal point and the surface of the beaded sheeting, the resulting image was a planar composite image that appeared to float approximately 1 cm above the sheeting. Moreover, the composite image displayed reasonably large movement in relation to an observer's viewing perspective, so an observer could easily view different aspects of the composite image depending upon the viewing angle.

Example Two

In this example, an exposed lens sheeting construction with a transparent mirror radiation sensitive layer was used to form a composite image that appeared to float below the microlens sheeting. The optical train used in Example One was also used in this Example. The microlensed sheeting was positioned relative to the aspheric lens 308 so that the lens was nearly in contact with the microlens sheeting. The laser output was adjusted to achieve approximately 14 mJ/cm$^2$ directly beneath the aspheric lens. The exposed lens sheeting consisted of partially embedded microspheres as described in U.S. Pat. No. 3,801,183, with a zinc-sulfide (ZnS) dielectric mirror vapor deposited onto one side of the microspheres. The thickness of the ZnS layer was nominally 60 nm. As in Example One, the laser was operated at 10 Hz while the sheeting was moved at 50.8 cm/min, resulting in the formation of continuous composite lines in the microlensed sheeting. A "globe" pattern (a circle with four inscribed arcs) was traced by the staging system.

Under ambient lighting, the globe appeared as a dark image against a white/yellow background. The dark composite image appeared to float approximately 39 mm below the sheeting. The location of the composite image corresponded to the location of the focal point of the aspheric lens, which for this Example correlated to approximately 39 mm behind the lens.

Example Three

This Example describes forming a composite image in an exposed lens sheeting with an aluminum radiation sensitive layer using a lens array in place of a single aspheric lens. An optical train of the type depicted in FIG. 15 was used to form a floating composite image. The optical train consisted of a Q-switched laser 300, a 99% reflective mirror 302, an optical diffuser 304, and a beam expansion telescope 306. These components of the optical train used in this example are identical to those described in Example One. Also included in the optical train of this Example was a two-dimensional lens array 407, a reflective mask 409 and a negative bi-concave lens 411. Areas of the reflective mask 409 were transparent, to coincide with the areas of the microlensed material 412 to be exposed to the laser radiation, while the remaining surface of the mask was opaque or reflective.

The lens array 407 consisted of a fused silica refractive microlens array available from MEMS Optical, LLC of Huntsville, Ala. under the designation 3038. This closed packed spherical lens array was placed almost in contact with a negative biconcave lens 411 having a diameter of 75 mm and focal length of negative 150 mm. Exposed lens sheeting 412 with an 80 nm thick aluminum radiation sensitive layer was placed within 25 mm of the negative bi-concave lens 411. The microlensed material was placed approximately 1 cm from the focal length of the combined optical path of the microlens array and the negative bi-concave lens. The output from the laser was adjusted to produce approximately 4 mJ/cm$^2$ at the surface of the exposed lens surface of the microlensed sheeting. A single laser pulse was activated to expose the entire image.

The resulting imaged microlensed sheeting, when viewed in ambient light, revealed images that appeared to float approximately 1 cm above the sheeting. The image appeared dark gray against a light gray background.

Example Four

In this Example, the diverging light source was obtained by reflection from a scattering source. The scattering reflector consisted of a ceramic bead approximately 5 mm in diameter. An optical train of the type depicted in FIG. 16 was used in this Example. It consisted of a Q-switched Nd:YAG laser 500, similar to that described in Example One, followed by a telescope 502 which reduced the size of the incident laser beam to a diameter of approximately 1 mm. The light was then impinged upon the ceramic bead 504 at an angle sufficiently deviated from normal so as to illuminate approximately one quarter of the hemisphere of the ceramic bead 504 facing the microlens sheeting 512. This was confirmed by viewing the scattered radiation through an infrared camera.

The ceramic bead 504 was positioned above the XY stage 510 at a distance of approximately 25 mm. The incident light from the laser was adjusted to be parallel to the sample stage. Embedded lens sheeting 512 with an 80 nm aluminum radiation sensitive layer was affixed to an XY stage 510 and a controller provided control signals to the stage and laser. The laser output was adjusted to obtain approximately 8 mJ/cm$^2$ at the surface of the microlens sheeting. Illumination of the ceramic bead 504 was adjusted to obtain the most uniform light exposure to the surface of the microlensed sheeting 512. The XY stage 510 was moved at 50.8 cm/minute with the laser pulsing at 10 Hz. A complex image was traced out with the stage while the microlensed sheeting was exposed to the scattered radiation from the ceramic reflector.

In ambient light, a composite image floated approximately 25 mm above the sheeting, and appeared dark gray against a light gray background. The image had large movement relative to the observer's viewing position. Under transmitted light, a luminous composite image floated approximately 25 mm above the sheeting.

Example Five

In this example, the material layer of an embedded lens sheeting consisted of multilayer optical stacks, tuned for specific colors in the visible spectrum. On one face of the microlensed base sheet, thin film layers were deposited by vacuum evaporation and plasma polymerization to obtain a layer sequence consisting of chromium/plasma polymerized butadiene/silicon dioxide/aluminum, with the chromium layer being adjacent to the embedded lens. The thicknesses of the individual materials were adjusted to obtain colors in the red, green, and blue portions of the visible spectrum. Table 1 provides the specific thicknesses of the individual materials prepared.

TABLE 1

| | Multilayer Construction | | | |
|---|---|---|---|---|
| Sample | Cr (nm) | PP (nm) | SiO$_2$ (nm) | Al (nm) | Color |
| 1 | 4 | 97 | 0 | 80 | Blue |
| 2 | 4 | 65 | 65 | 80 | Light Blue |
| 3 | 4 | 89 | 65 | 80 | Green |
| 4 | 4 | 165 | 20 | 80 | Red/Blue |

The coated microlens base sheets were then laminated to a backing with the multilayers in contact with the laminating material. The liner of the microlens sheeting was then removed to expose the front surface of the embedded lenses with colors given by the above table.

An optical train as described in Example One was used to image the samples of this example. In this example, the focal point of the asphere was positioned 1 cm above the microlens sheeting. The laser output was adjusted to obtain an energy density of 5 mJ/cm$^2$ at the surface of the microlens sheeting. The optical properties of the multilayer stacks were modified in the regions irradiated. A globe pattern was traced to provide images in the multilayer stacks in a manner similar to that described in Example One.

In ambient lighting, the irradiated regions appeared light yellow to orange in color against the background color of the microlensed sheeting. All composite images appeared to float above the sheeting and move relative to the observer.

Example Six

This example describes a second type of multilayer tuned stack as the radiation sensitive layer for producing a colored composite image. The optical stacks were prepared on a microlensed base sheet consisting of embedded lens sheeting. On one face of the microlensed base sheets, thin film layers were deposited by vacuum evaporation to obtain a layer sequence consisting of chromium/cryolite/aluminum (Cr/Na$_3$AlF$_6$/Al), chromium/silicon dioxide/aluminum (Cr/SiO$_2$/Al), or chromium/magnesium fluoride/aluminum (Cr/MgF$_2$/Al), as shown in Table 2, below. The thicknesses of the dielectric materials, SiO$_2$, Na$_3$AlF$_6$ and MgF$_2$, were adjusted to obtain a variety of colors in the visible spectrum. Table 2 provides the specific thicknesses of the individual materials prepared in the various samples.

TABLE 2

| | Multilayer Construction | | | | | | |
|---|---|---|---|---|---|---|---|
| Sample | Cr Thickness (nm) | Na$_3$AlF$_6$ Thickness (nm) | SiO$_2$ Thickness (nm) | MgF$_2$ Thickness (nm) | Al Thickness (nm) | Color | Imaging Energy Density (mJ/cm$^2$) |
| A | 4.8 | 200 | 0 | 0 | 83 | Blue | 12.7 |
| B | 4.2 | 0 | 135 | 0 | 83 | Deep Blue | 8.6 |
| C | 4.2 | 0 | 0 | 259 | 83 | Aquagreen | 8.6 |
| D | 4.2 | 0 | 275 | 0 | 83 | Violet | 7.5 |
| E | 4.2 | 0 | 160 | 0 | 83 | Green | 7.5 |
| F | 4.2 | 0 | 225 | 0 | 83 | Orange-tan | 7.5 |

The coated microlens base sheets were then laminated to a backing such that the multilayer was in contact with the laminating material. The liner of the microlens sheeting was then removed to expose the front surface of the embedded lenses with colors given by the above table.

An optical train as described in Example One was used to image these samples. In this example, the position of the final aspheric lens was positioned to be almost in contact with the sample to provide a composite image that appeared to float below the sheeting. The laser energy was adjusted to obtain an energy density that would permanently alter the optical properties of the respective multilayer stacks, as shown in Table 2. The alphanumeric characters "SAMPLE" were traced for the image in this material in a manner similar to that described in Example One. In ambient lighting, the composite image appeared dark with a white/yellow outline against the background color of the microlensed sheeting. All composite images appeared to float approximately 39 mm below the sheeting and to move with respect to an observer viewing the sheeting.

Example Seven

In this example, a color composite image was formed in an embedded lens sheeting using a phase change alloy of 50 atomic percent Silver and 50 atomic percent of Zinc ($Ag_{50}Zn_{50}$) and a tuned bilayer stack consisting of chromium and silicon dioxide as the radiation sensitive layer. The phase change alloy was not ablated by the applied radiation, while the tuned bilayer enhances the spectral reflectance in the blue portion of the visible electromagnetic spectrum. The radiation sensitive layer was deposited onto the spacer layer of the enclosed lens sheeting in a manner similar to the procedure used to deposit the thin film layers of the multilayer stack unto the microlensed base sheet in Example Five. First, the chromium and silicon dioxide layers were vacuum deposited onto the polymeric spacer layer to thicknesses of 40 nm and 260 nm, respectively. Next, an 80 nm thick layer of $Ag_{50}Zn_{50}$ alloy was sputter deposited onto the silicon dioxide layer. The samples were then laminated and stripped to expose the clear portion of the microlens sheeting.

The sheeting, when viewed under ambient (reflected) light, appeared to be violet-blue. An optical train similar to Example One was used to image the $Ag_{50}Zn_{50}$ radiation sensitive layer. In place of the Q-switched laser, a continuous wave Nd:YAG laser operating at a wavelength of 1.06 um, was used as the energy source. The pulse width was controlled by the use of an acousto-optic modulator in the optical train. The first order diffraction beam was sent through an optical train of the type depicted in FIG. 14. Samples of the enclosed lens sheeting were affixed to an XYZ stage. The laser power into the acousto-optic modulator was adjusted to give 810 mW of power at the microlensed material. The acousto-optic modulator was set to achieve 20 Hz pulsing at 100 microsecond pulse widths. A positive aspheric lens, as described in Example One, was placed 12 mm above the surface of the microlensed material. An image was traced out with the XYZ stage while the laser radiation exposed the radiation sensitive layer.

When the sheeting was viewed in ambient lighting, the imaged regions appeared light blue in color and floated about 12 mm above the microlens sheeting.

Example Eight

In this Example, a replicated lens structure with a copper radiation sensitive layer was used as the microlens sheeting. Replicated sheeting of the type described in U.S. Pat. No. 5,254,390 was used as the microlens sheeting. A radiation sensitive layer of copper was vacuum evaporated on to the flat surface of the sheeting to a thickness of 80 nm. The microreplicated microlensed material was exposed to laser radiation from an optical train as described in Example One. The final aspheric lens was positioned with the focal point 6.5 mm away from the surface of the microlensed material. The laser output was adjusted to give approximately 7 $mJ/cm^2$ at the surface of the sheeting. The laser was set to pulse at 10 Hz while the XYZ staging moved at a speed of 50.8 cm/minute. A "globe" pattern (a circle with four inscribed arcs) was traced above the sample.

When the sheeting was viewed in ambient lighting, a whitish image of a floating globe could be seen against the copperish color of the radiation sensitive layer. This composite image appeared to float about 6 mm above the sheeting.

Example Nine

This Example describes the combination of a planar composite image with a composite image that appeared to float below the sheeting. Exposed lens microlens sheeting with an 80 nm thick aluminum radiation sensitive layer was imaged using the optical configuration described in Example One. The aspheric lens was positioned nearly in contact with the microlens sheeting, and the laser output was adjusted to yield 4 $mJ/cm^2$ at the sample surface. The controller was programmed to trace the alphanumeric characters "SAMPLE." An absorptive mask was placed on top of the open sheeting. This mask was made by printing rows of the alphanumeric characters "3M" onto transparency sheets by way of a conventional photocopier. The alphanumeric characters absorbed the radiation while the surrounding areas would transmit the laser radiation. The exposed lens sheeting with this absorptive mask was positioned so that the "SAMPLE" characters were formed over the top of the mask position.

When viewed under ambient lighting, the characters "SAMPLE" appeared to float about 39 mm below the sheeting, while the unexposed characters "3M" appeared to be in the plane of the sheeting. The "3M" characters were only observable against the dark characters from the "SAMPLE" characters.

Example Ten

This Example describes a sheeting with a complex, three-dimensional image. An embedded lens microlens sheeting with an 80 nm thick aluminum radiation sensitive layer was used in this Example. The optical train used in Example One was used. The microlensed sheeting was attached to the XY plane of an XYZ translation stage, while an aspheric lens was attached to the z-axis. The aspheric lens had a NA of 0.64 and a focal length of 39 mm. The controller was programmed to trace the outline of an isometric cube with 5 cm long cube diagonals (the distance between two opposite corners of the cube). The relative position and orientation of the cube as programmed in the controller placed one end of the composite cube image approximately 5 mm above the surface of the sheeting, and the other end of the composite cube image 5.5 cm above that surface. The cube image was oriented to place a corner of the cube closest to the observer.

During the tracing of the isometric cube, the energy per pulse from the laser was controlled to yield a constant energy density of 8 $mJ/cm^2$ at the sample surface regardless of the spacing between the diverging lens and the sheeting. The laser operated at 10 Hz and X, Y and Z stages moved at a speed of 50.8 cm/minute. The image of the isometric cube was continuously traced out in space above the microlensed sheeting by the controller.

When viewed in ambient lighting, the isometric composite cube image appeared dark gray against a light gray background, floating from between 5 mm and 5.5 cm above the surface. Furthermore, as an observer changed his or her viewing perspective, the isometric cube appeared to rotate in space above the microlens sheeting to expose sides of the cube that were previously obscured at different viewing angles.

Example Eleven

This Example describes a floating image that can be made to disappear. That is, the composite image can, by changing the viewing angle, be made to disappear from or reappear to view. An embedded lens sheeting with an 80 nm thick aluminum radiation sensitive layer was used. An optical train similar to that in Example One was used to form the images, and the distance of the aspheric lens from the sheeting was adjusted to position the focal point 1 cm above the microlensed sheeting. The controller was programmed to produce a "globe" pattern (a circle with four inscribed arcs) and the laser output was adjusted to provide 8 $mJ/cm^2$ at the sample surface. On the sample itself, a square section of translucent tape was attached to the surface of the embedded lens sheeting. The square section of tape was positioned so that during the imaging of the globe, a portion of the area imaged by the laser would overlap the section covered by the translucent tape.

When the imaged sheeting was viewed under ambient light, a floating globe pattern was observed as a dark gray image against a light gray background, floating 1 cm above the sheeting. By varying the viewing angle, the "globe" moved into or out of the region that was masked by the translucent tape. When the globe moved into the masked region, the portion of the globe in that region disappears. When the globe moved out of the masked region, the portion of the globe in that region reappeared. The composite image did not merely fade gradually away as it passed into the masked region, but rather completely disappeared exactly when it passed into that region.

Imaged sheeting containing the composite images of this invention are distinctive and impossible to duplicate with ordinary equipment. The composite images can be formed in sheeting that is specifically dedicated to applications such as passports, identification badges, banknotes, identification graphics, and affinity cards. Documents requiring verification can have these images formed on the laminated sheeting for identification, authenticity, and enhancement. Conventional bonding means such as lamination, with or without adhesives, may be used. Providers of items of value, such as boxed electronic products, compact discs, driver's licenses, title documents, passports or branded products, may simply apply the multilayer film of this invention to their products and instruct their customers only to accept as authentic items of value so labeled. For products requiring these protections, their appeal may be enhanced by the inclusion of sheeting containing composite images into their construction or by adhering such sheeting to the products. The composite images may be used as display materials for advertising, for license plates, and for numerous other applications in which the visual depiction of a unique image is desirable. Advertising or information on large objects, such as signs, billboards, or semitrailers, would draw increased attention when the composite images were included as part of the design.

Sheeting with the composite images has a very striking visual effect, whether in ambient light, transmitted light, or retroreflected light in the case of retroreflective sheeting. This visual effect can be used as a decoration to enhance the appearance of articles to which the imaged sheeting is attached. Such an attachment could convey a heightened sense of fashion or style and could present a designer logo or brand in a very dramatic way. Envisioned uses of the sheeting for decoration include applications to apparel, such as everyday clothing, sports clothing, designer clothing, outerwear, footwear, caps, hats, gloves and the like. Similarly, fashion accessories could utilize imaged sheeting for decoration, appearance, or brand identity. Such accessories could include purses, wallets, briefcases, backpacks, fanny packs, computer cases, luggage, notebooks and the like. Further decorative uses of the imaged sheeting could extend to a variety of objects that are commonly embellished with a decorative image, brand, or logo. Examples include books, appliances, electronics, hardware, vehicles, sports equipment, collectibles, objects of art and the like.

When the decorative imaged sheeting is retroreflective, fashion or brand awareness can be combined with safety and personal protection. Retroreflective attachments to apparel and accessories are well known and enhance the visibility and conspicuity of the wearer in low-light conditions. When such retroreflective attachments incorporate the composite imaged sheeting, a striking visual effect can be achieved in ambient, transmitted, or retroreflected light. Envisioned applications in the area of safety and protective apparel and accessories include occupational safety apparel, such as vests, uniforms, firefighter's apparel, footwear, belts and hardhats; sports equipment and clothing, such as running gear, footwear, life jackets, protective helmets, and uniforms; safety clothing for children; and the like.

Attachment of the imaged sheeting to the aforementioned articles can be accomplished by well known techniques, as taught in U.S. Pat. Nos. 5,691,846 (Benson, Jr. et al.), 5,738,746 (Billingsley et al.), 5,770,124 (Marecki et al.), and 5,837,347 (Marecki), the choice of which depends on the nature of the substrate material. In the case of a fabric substrate, the sheeting could be die cut or plotter cut and attached by sewing, hot-melt adhesive, mechanical fasteners, radio frequency welding or ultrasonic welding. In the case of hardgoods, a pressure-sensitive adhesive may be a preferred attachment technique.

In some cases, the image may be best formed after the sheeting is attached to a substrate or article. This would be especially useful when a custom or unique image was desired. For example, artwork, drawings, abstract designs, photographs, or the like could be computer generated or digitally transferred to a computer and imaged on the sheeting, the unimaged sheeting having been previously attached to the substrate or article. The computer would then direct the image generation equipment as described above. Multiple composite images may be formed on the same sheeting, and those composite images may be the same or different. Composite images may also be used along with other conventional images such as printed images, holograms, isograms, diffraction gratings, kinegrams, photographs, and the like. The image may be formed in the sheeting before or after the sheeting is applied to an article or object.

Composite Images Having Different Viewing Angle Ranges

As demonstrated above, the composite image viewable from a microlens sheeting may have reasonably large movement in relation to an observer's viewing perspective, so an observer could easily view different aspects of the composite image depending upon the viewing angle. Furthermore, as demonstrated above, as an observer changes his or her viewing perspective, the appearance of the composite image may rotate in space above the microlens sheeting to expose different portions of the composite image that were previously obscured at different viewing angles.

As described below, the microlens sheeting can be configured to present a plurality of different composite images from the images formed within the microlens sheeting. Moreover, the different composite images may each be associated with a different viewing angle range, such that different composite images may be viewed from different viewing angles of the sheeting. In some embodiments, the microlens sheeting may present two or more different composite images, and each may be viewable at different viewing angle ranges. In this example, two observers positioned at different viewing angles with respect to the sheeting may view different composite images presented by the sheeting. In another embodiment, the sheeting may be imaged to present the same composite image over multiple viewing angle ranges. In some cases, the viewing angle ranges may overlap to provide a larger continuous viewing angle range. As a result, the composite image may be viewed from a much larger viewing angle range than is otherwise possible. The following description sets forth techniques that may be applied to image a microlens sheeting and control the viewing angle ranges of any composite images formed thereby. Moreover, the techniques may be applied to precisely image a microlens sheeting in a high-speed manner suitable for processing a continuous web of sheeting.

Figure 17A:
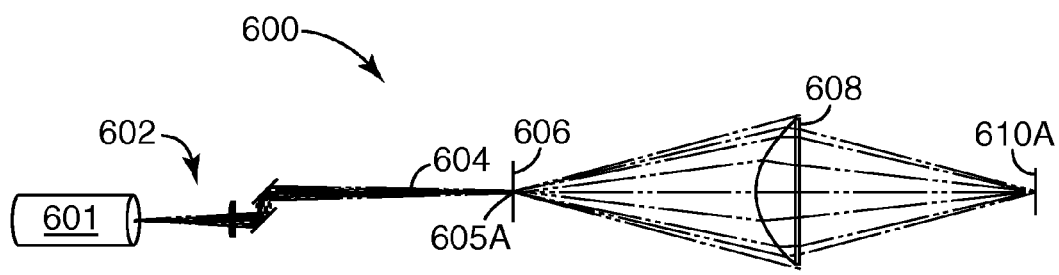
FIGS. 17A and 17B are block diagrams illustrating an example optical train for writing a floating image to a sheeting.
Figure 17B:
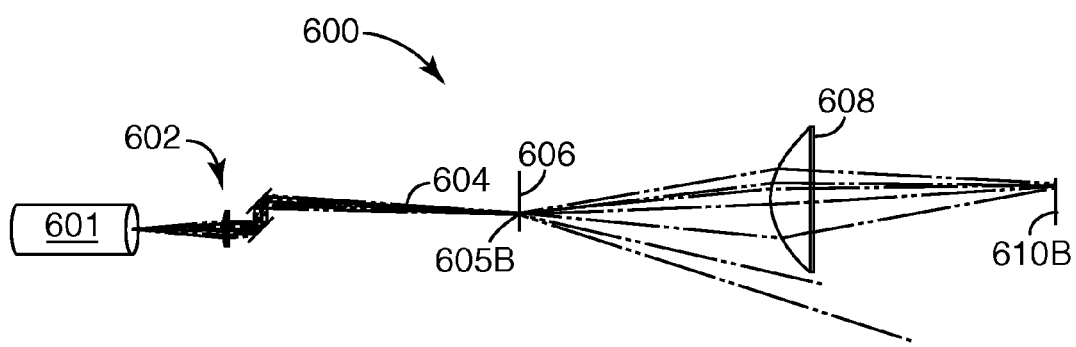

FIGS. 17A and 17B are block diagrams illustrating an example optical train 600 for forming a floating image within a microlens sheeting (not shown) so that the floating image is written with high numerical aperture (NA) lenses by a galvanometer scanner.

FIGS. 17A and 17B show the optical train imaging the sheeting at a first position at a first point in time and a second position at a second point in time, respectively. For example, FIGS. 17A and 17B may represent two points in time while optical train 600 images the microlens sheeting to produce a single floating image. That is, FIG. 17A shows a beam of energy 604 striking lens array 606 at a first position 605A, while FIG. 17B shows beam of energy 604 striking lens array 606 at a second position 605B.

A technique referred to herein as relay imaging uses a galvanometer scanner 602 to write floating images at a high linear rate, such as greater than 200 mm/sec. Galvanometer scanner 602 may receive a beam of energy from a fixed radiation source 601 (e.g., a laser), which is directed to a set of high-speed moving mirrors to write the images at high rate. Writing floating images at a high rate may be preferred, because unwanted overexposure of the sheeting may occur at slower rates. Relay imaging may be used to write floating images that contain features that appear to float above and/or sink beneath the plane of the microlens sheeting (not shown in FIGS. 17A, 17B). Relay imaging may also be used to write floating images that have regions containing features that exhibit a continuous change in float height above, below, or both above and below the plane of the microlens sheeting.

The relay imaging method uses an intense radiation source 601, such as a laser, with galvanometer scanner 602 to illuminate an area of high numerical aperture (NA) lenses (lenslets) in a lens array 606. A high NA lens is a lens with a NA equal to or greater than 0.3. The radiation source may, for example, be any of the radiation sources described above under Section III. As another example, the radiation source may be a neodymium doped laser, such as neodymium-doped glass (Nd:Glass), neodymium-doped yttrium orthovanadate (Nd:YVO$_4$), neodymium-doped gadolinium orthovandadate, or other neodymium doped lasers.

As shown in FIGS. 17A and 17B, the illuminated lenslets within lens array 606 focus the light to form an array of cones of highly divergent light, each cone being centered on its corresponding lenslet in the array. The divergent cones of light from the lens array are collected by a system of adaptable relay optics that includes objective 608, and refocused at a controlled distance from a lensed substrate, i.e., a microlens sheeting (not shown). In this manner, the apparent location of the divergent light cones formed by lens array 606 illuminated by the radiation source appears to be at the focal position 610A (FIG. 17A), 610B (FIG. 17B) of the adaptable relay optics. As discussed herein, optical train 600 may be configured to locate focal position 610A in front, behind, or in the same plane as the microlens sheeting. The divergent light is used to write a floating image in the microlens sheeting. The phrase "to write a floating image" is used synonymously herein with the term "to form a floating image."

The pattern of the floating image written by this process is determined by which lenses in lens array 606 are illuminated by the incident light. For example, galvanometer scanner 602 may be used to move a laser beam 604 around a surface of lens array 606 to locally illuminate desired lenses in lens array 606 by tracing a pattern that corresponds to the resulting floating image, i.e., composite image. In this approach, only a few lenses in lens array 606 are illuminated at a given time. FIG. 17A shows galvanometer scanner 601 positioning laser beam 604 to illuminate a first portion of lens array 606 such that the divergent light cones focus at a first focal position 610A. FIG. 17B shows galvanometer scanner 601 positioning laser beam 604 to illuminate a second portion of lens array 606 such that the divergent light cones focus at a second focal position 610B. The illuminated lenses provide the cone or cones of divergent light to be imaged by the relay optics to form each pixel of the floating image. In some cases, the microlens sheeting may be positioned between objective 608 and focal position 610A, 610B. In other examples, the microlens sheeting may be positioned beyond focal position 610A, 610B. The energy of the light rays impinging upon the microlens sheeting is focused by the individual microlenses to a position within the sheeting, such as to a radiation-sensitive material layer disposed adjacent the layer of microlenses, or to a position within the layer of microlenses itself. The portion of the sheeting on or in which an image is formed is different for each microlens, because each microlens "sees" the incoming energy from a different perspective. Thus, a unique image is formed in the material layer associated with each microlens, and each unique image may represent a different partial or substantially complete image of the virtual image.

As described above, the floating image, i.e., composite image, can be thought of as the result of the summing together of many images, both partial and complete, all with different perspectives of a real object. The many unique images are formed through an array of miniature lenses, all of which "see" the object or image from a different vantage point. Behind the individual miniature lenses, a perspective of the image is created in the sheeting that depends on the shape of the image and the direction from which the imaging energy source was received.

During this scanning process, a control system may be used to synchronously change the location of the focal point of the adaptive relay optics train relative to the microlens sheeting as a function of position in the plane of the microlens sheeting, to produce one or more composite images that contain features with a continuous variation in float height or sink depth.

In another example, as described above, determining which lenses in the lens array are to be illuminated by the incident light may alternatively be done by way of a mask placed on the lens array. The mask may contain transparent areas that correspond to sections of the microlens sheeting that are to be exposed to the light source, and reflective areas that correspond to sections of the microlens sheeting that should not be exposed. The floating image is formed in the microlens sheeting by illuminating the lens array having the mask with light from the high-intensity light source. The image of the divergent light cones formed by the lens array, corresponding to the pattern of transparent areas in the mask, is transferred by the relay optics to the desired floating depth position relative to the microlens sheeting for writing the floating image.

In yet another example, the microlens sheeting may be placed between lens array 606 and objective 608. In this case, the lenses in lens array 606 may be high NA lenses, and are illuminated by laser beam 604, as described above. The illuminated lenses of lens array 606 create the cone or cones of divergent light to image the microlens sheeting to form the different partial or substantially complete images of the virtual image. During this scanning process, a control system may be used to synchronously change the location of the focal point of the lenses in the lens array relative to the microlens sheeting as a function of position in the plane of the microlens sheeting, to produce one or more composite images that contain features with a continuous variation in float height.

Figure 18:
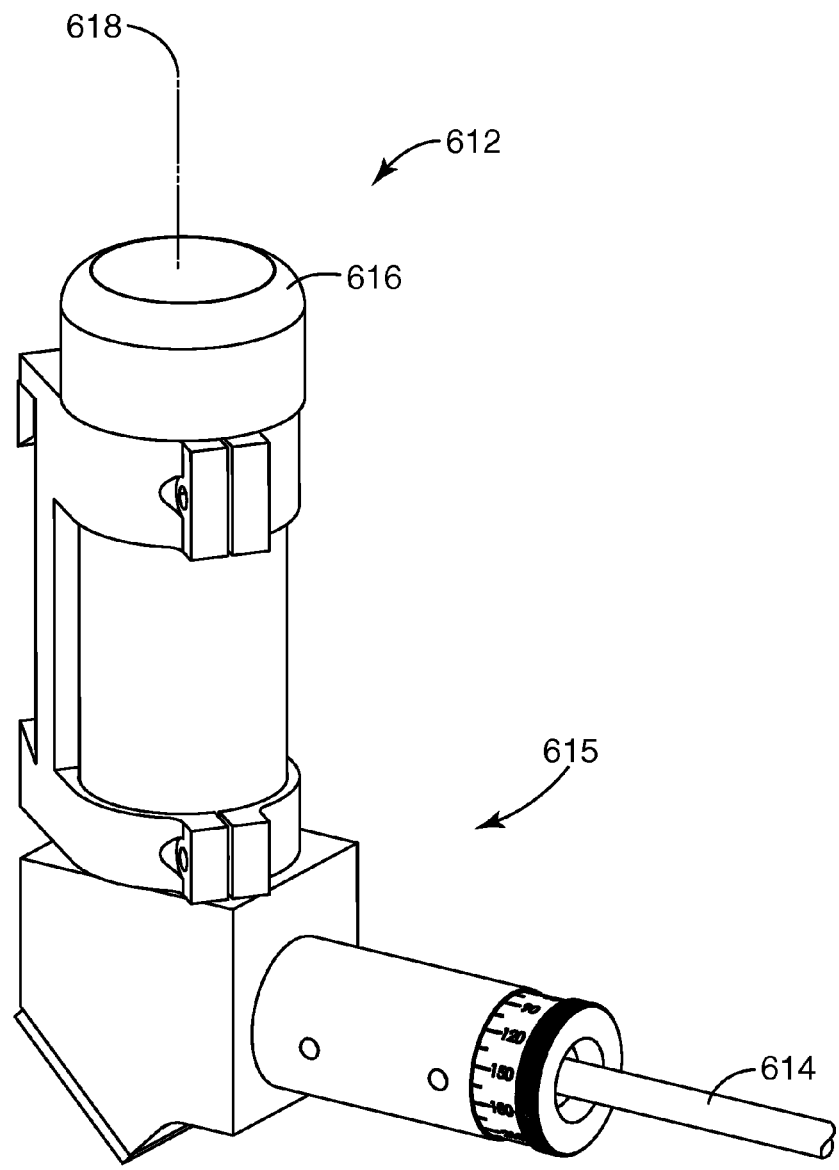
FIG. 18 is a block diagram illustrating an optical assembly that focuses a laser beam for writing to a substrate.

FIG. 18 is a block diagram illustrating an optical assembly 612 that focuses a laser beam for writing to a substrate. Optical assembly 612 may be referred to as a laser "pen." Laser energy is delivered to optical assembly 612 via optical fiber cable 614 that enters at a collar of a housing 615 of optical assembly 612. In the example of FIG. 18, the laser energy is then turned 90 degrees before being passed through a collimating lens (not shown) and a focusing lens located within cap 616 of optical assembly 612. The focusing lens focuses the laser energy at a focal point 618 used to write to a substrate.

Figure 19:
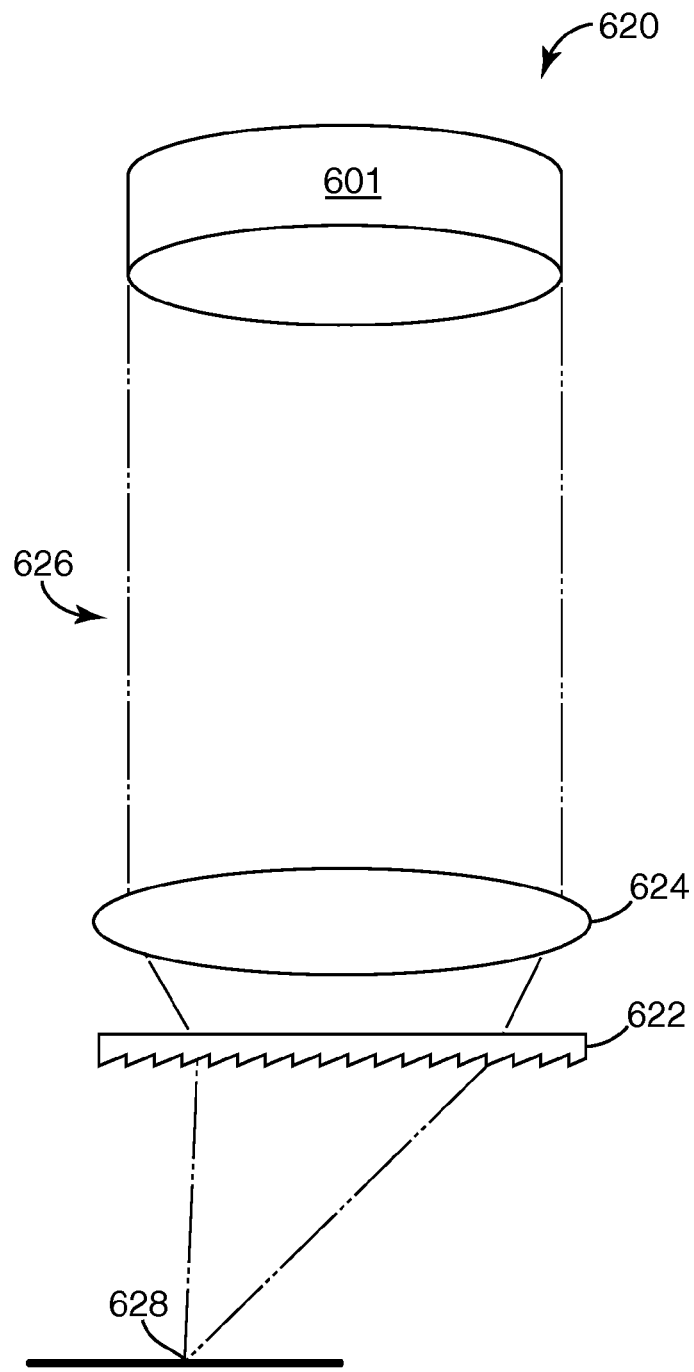
FIG. 19 is a block diagram illustrating an arrangement of optical elements that may comprise a portion of an optical system.

FIG. 19 is a block diagram illustrating an arrangement of optical elements 620 that may comprise a portion of an optical system in accordance with the techniques described herein. For example, the arrangement of optical elements 620 may be part of an optical system contained within an optical assembly such as the optical assembly of FIG. 18. Alternatively, a portion or all of the arrangement of optical elements 620 may be part of an optical system external to the radiation source for delivery of the beam to the microlens sheeting.

As shown in FIG. 19, placing a section of a Fresnel lens 622 after a final objective 624 of the optical train may allow the microlens sheeting (not shown) to be imaged so that the floating images are viewable at a predetermined viewing angle that is offset from the surface normal of the microlens sheeting. In other words, center of the beam for imaging the microlens sheeting is not perpendicular to surface of the microlens sheeting, and the viewing angle may be asymmetric with respect to the surface normal.

The optical system of which the arrangement of optical elements 620 comprises a portion may also include a radiation source 625 that illuminates optical elements (not shown) in the optical system that may modify the radiation beam prior to the radiation beam 626 reaching final objective 324. Final objective 624 and Fresnel lens 622 cause the radiation beam 626 to focus at a focal position 628.

This technique of using Fresnel lens 622 may allow a floating image to be viewable at an angle from one side of a surface of a microlens sheeting, but not viewable at the same angle from another side of the surface. In addition, multiple floating images may be written to the microlens sheeting having different offset angles. For example, a sheeting may be imaged and applied to a vehicle dashboard such that a first floating image may viewable only to a driver of the vehicle while a second floating image may be viewable only to a passenger of the vehicle. Writing multiple floating images having different viewing angles according to this technique may require rotating Fresnel lens 622, rotating the microlens sheeting, or switching Fresnel lens 622 with a different Fresnel lens to write at a different viewing angle.

Another technique for writing floating images at different viewing angle offsets from the surface normal of a substrate makes use of high-speed, finely controlled robotic machinery, such as a six-axis robot arm. FIG. 20 is a block diagram illustrating a system 630 that includes an example controller 635 coupled to a six-axis robot arm 632 for writing floating images. Six-axis robot arm 632 provides x, y, z motion combined with an approach vector described by the angles α and θ to create images at specific viewing angles. As illustrated in FIG. 20, a optical assembly 634 is mounted to six-axis robot arm 632. Controller 635 executes a control program in the form of software instructions to output a series of movement commands to control movement of robot arm 632 to position and orient one or more light sources affixed to an end of the robot arm relative to the microlens sheeting. That is, controller 635 controls the position and orientation of robot arm 632 to precisely image the microlens sheeting to produce floating images.

Figure 21A:
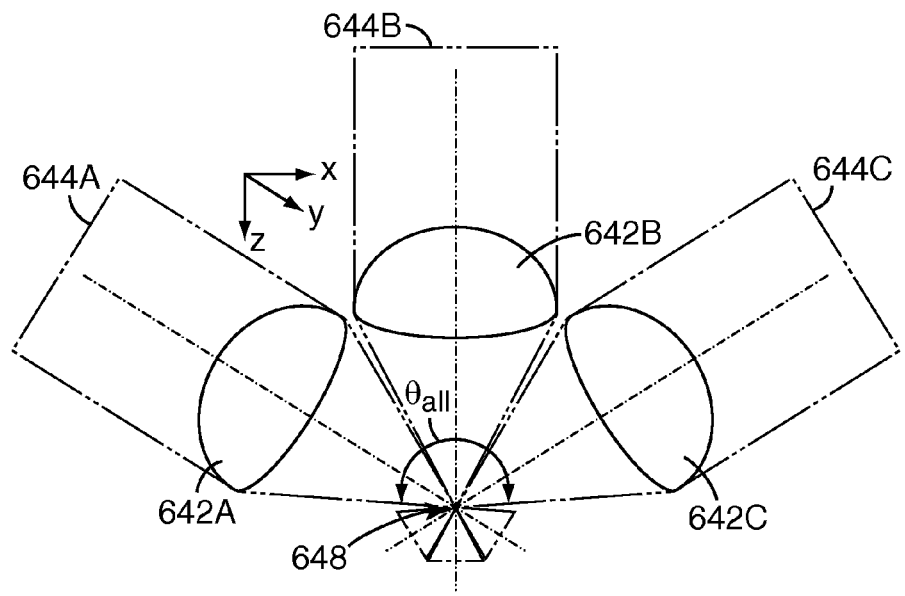
FIG. 21A is a block diagram illustrating a side view of an example objective assembly that includes three objectives that respectively focus three laser beams.
Figure 21B:
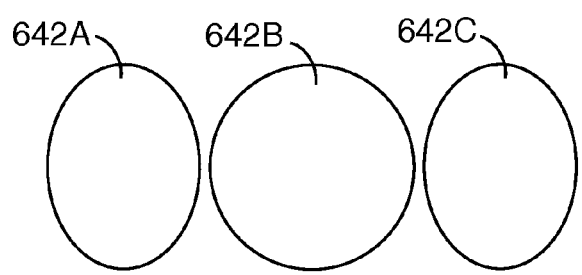
FIG. 21B is a block diagram illustrating a top view of the three lens apertures of the objective assembly of FIG. 21A.

For example, by controlling robot arm 632 to image the microlens sheeting such that the center of the energy beam is offset from a surface normal of the microlens sheeting, system 630 may be used to write floating images that are only visible within a single viewing angle cone offset from the surface normal. Alternatively, system 630 may also be used to write floating images that have multiple viewing angle cones. For example, system 630 may control robot arm 632 to write the same floating image at multiple viewing angle cones, allowing the same floating image to be observed from multiple viewing angles. System 630 may write multiple floating images having overlapping viewing angle cones so as to result in a larger continuous viewing angle. Six-axis robot arm 632 may be used to write floating images that have regions containing features that exhibit a continuous change in float height above, below, or both above and below the plane of the microlens sheeting Simultaneous writing of floating images with multiple viewing angle cones can be achieved by combining multiple optical objectives into a single optical assembly, e.g., a single laser pen. FIG. 21A is a block diagram illustrating a side view of an objective assembly 640 that includes three objectives 642A-642C ("objectives 642") that respectively focus three laser beams 644A-644C. FIG. 21B is a block diagram illustrating a top view of the three lens apertures of objective assembly 640.

Objective assembly 640 may be mounted in a single laser pen, such as the optical assembly of FIG. 19, such that a focal point 648 for each beam 644 is in the same location. As illustrated in FIGS. 21A and 21B, objective assembly 640 may be used to write a floating image to a microlens sheeting having three distinct viewing angle cones. This may effectively increase the viewing angle to $\theta_{all}$ in the x-direction, though there may be small gaps within the viewing angle $\theta_{all}$ between the individual viewing angle cones where the floating image cannot be seen. Objectives 642A, 642B, and 642C may be controlled to write the same floating image, or may write different floating images. In the case of writing different floating images, each individual floating image is viewable over only the portion of the viewing angle $\theta_{all}$ that corresponds to a respective one of objectives 642.

In one example embodiment, the laser pen mounted with objective assembly 640 may be held by or otherwise mounted to six-axis robot arm 630 of FIG. 20. Objective assembly 640 is merely exemplary, and other numbers of objectives may be mounted within a single laser pen, e.g., two or more.

Laser beams 644A-644C may be provided by three separate fiber optic paths, or may be split from a single fiber optic path.

Figure 22A:
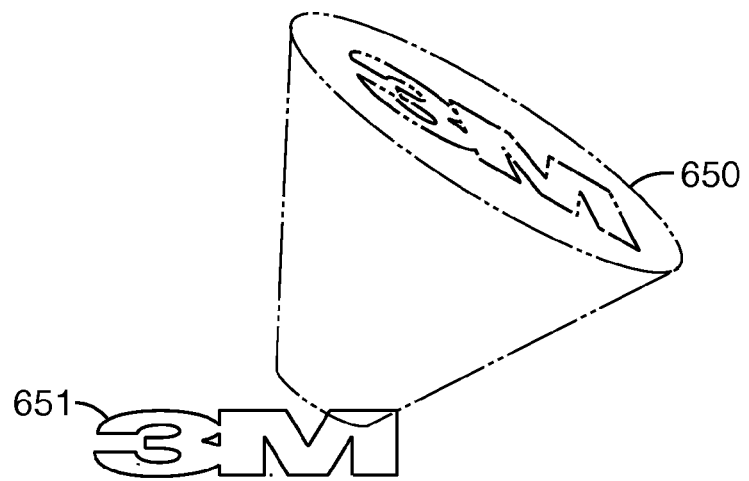
FIGS. 22A-22C are block diagrams illustrating example viewing angle cones of floating images written in accordance with the techniques described herein.
Figure 22B:
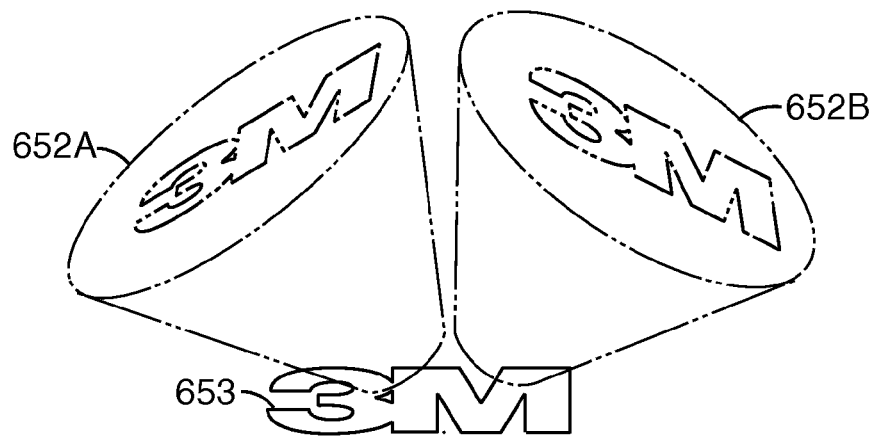
Figure 22C:
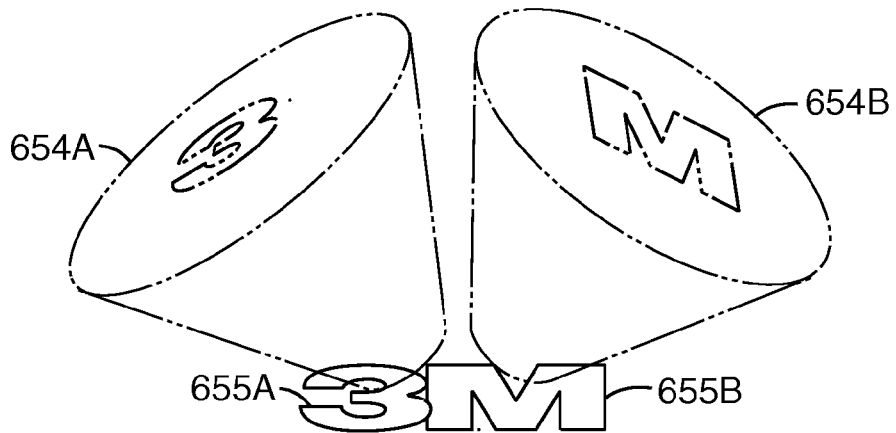

FIGS. 22A-22C are block diagrams illustrating example viewing angle cones of floating images written in accordance with the techniques described herein. FIG. 22A illustrates a single floating image 651 of the word "3M" having a single viewing angle cone 650 that is offset from the surface normal of a sheeting. Thus, an observer may view the "3M" floating image 651 only when viewing the sheeting at an angle within viewing angle cone 650. FIG. 22B illustrates two overlapping floating images 653 of the word "3M" having different viewing angle cones 654A, 652B ("viewing angle cones 652") that are each offset from the surface normal of a sheeting. Thus, an observer may view the "3M" floating images 653 when viewing the sheeting at an angle within either of viewing angle cones 652A and 652B. The floating images are overlapping in that the focal point of each of the radiation source beams trace the same path, but at different incident angles. In other words, each of the floating images is formed by images associated with a common subset of the microlenses within the sheeting.

FIG. 22C illustrates two floating images 655A-655B ("floating images 655") having different viewing angle cones 654A, 654B ("viewing angle cones 654"). Floating image 655A is an image of the number "3," and floating image 655B is an image of the letter "M." Floating image 655A is visible to an observer only within viewing angle cone 655A, and floating image 655B is visible to an observer only within viewing angle cone 655B. Thus, floating image 655A is only viewable at an angle on the left side of the sheeting, but not viewable at the same angle on the right side of the sheeting. Similarly, floating image 655B is only viewable at an angle on the right side of the sheeting, but not viewable at the same angle on the left side of the sheeting.

In one example embodiment, floating images 651, 653, 655 may be written using an arrangement of optical elements including a Fresnel lens, as described above with respect to FIG. 19. In this embodiment, the Fresnel lens must be rotated or switched to create the floating images 653 and 655 having different viewing angle cones 652, 654. In another example embodiment, floating images 651, 653, 655 may be written using system 630 with six-axis robot arm 632 of FIG. 20 mounted with a multi-objective laser pen as described in FIG. 21A. In this embodiment, the multiple floating images 653 of FIG. 21B and floating images 655A, 655B may be written simultaneously.

Figure 23:
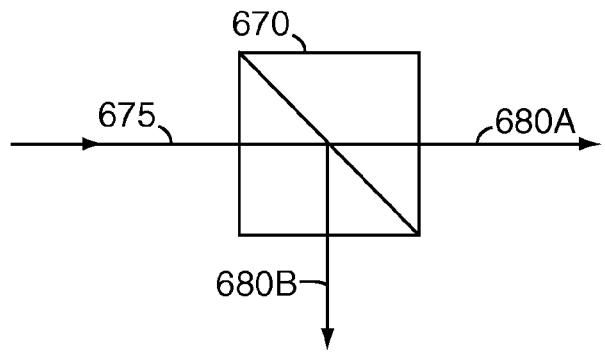
FIG. 23 is a block diagram illustrating a beam splitter for splitting an incident beam into channels.

A variety of methods of splitting a single beam from a single laser to multiple beam paths for simultaneous image writing may be used. For example, a beam splitter may be used to split a laser beam into multiple channels. FIG. 23 is a block diagram illustrating a beam splitter 670 for splitting an incident beam 675 into channels 680A and 680B. For example, beam splitter 670 may be a 50/50 beam splitter that divides incident beam 675 equally to two channels. Incident beam 675 may be in a random polarization. Such a beam splitter may be incorporated into a system based on a Michelson interferometer.

Figure 24:
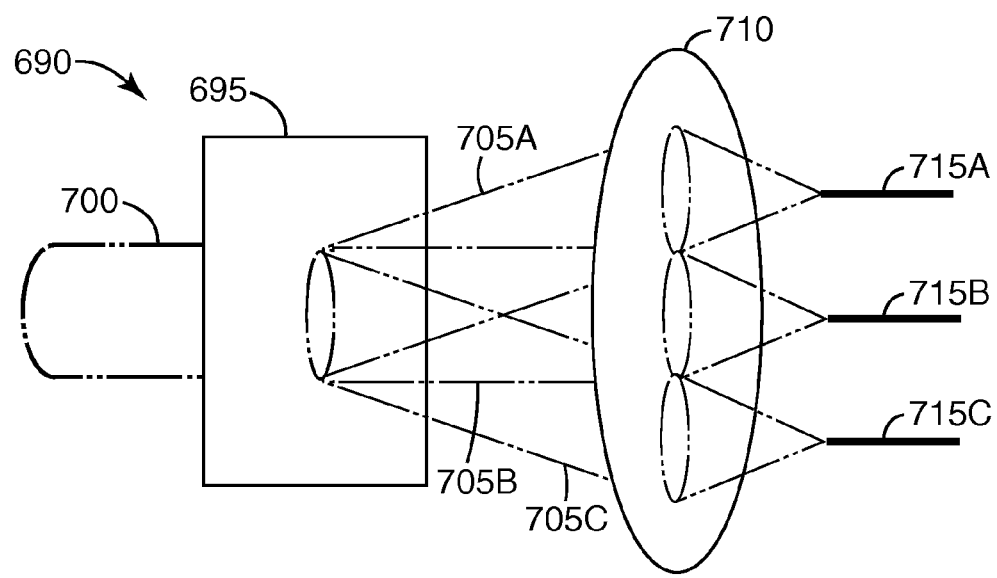
FIG. 24 is a block diagram illustrating an exemplary beam splitting system that includes an optical grating that diffracts incident beam into multiple beams.

As another example, beams may be split based on optical grating, holographic optical elements, or phase masks, which use grating patterns that diffract incident light into multiple beams. FIG. 24 is a block diagram illustrating an exemplary beam splitting system 690 that includes an optical grating 695 that diffracts incident beam 700 into multiple beams 705A-705C ("beams 705"). Optical grating 695 may be a holographic optical element or a phase mask. Incident beam 700 may be a collimated beam. As shown in FIG. 24, optical grating 695 divides incident beam 700 into three beams 705 with equal angle spacing. Beams 705 are focused by telecentric lens 710 into three equally spaced focal positions that respectively couple to optical fibers 715A-715B mounted on a fiber array. The ratio of the spacing between the fibers and the focal length of the telecentric lens is the diffraction angle of optical grating 695.

Optical grating 695 may have a grating pitch from 10-60 microns that splits incident beam 700 into three beams 705 (0, +1, and −1 diffraction order) with a 0.022 wavefront error. The diffraction angles θ are calculated according to the following equation:

$$\sin\theta = \frac{N\lambda}{X},$$

where N is the diffraction order, λ is the wavelength, and X is the pitch. The ratio of the energy diffracted to each order can be designed to be 1:1:1.

Beam splitting system 690 may also be used to split energy to each order in unequal amounts. Although illustrated as splitting incident beam 700 into three beams 705, beam splitting system 690 may be used to split incident beam 700 into more or fewer beams. For example, beam splitting system 690 may be used to split incident beam 700 into 5, 7, or 9 beams.

Figure 25:
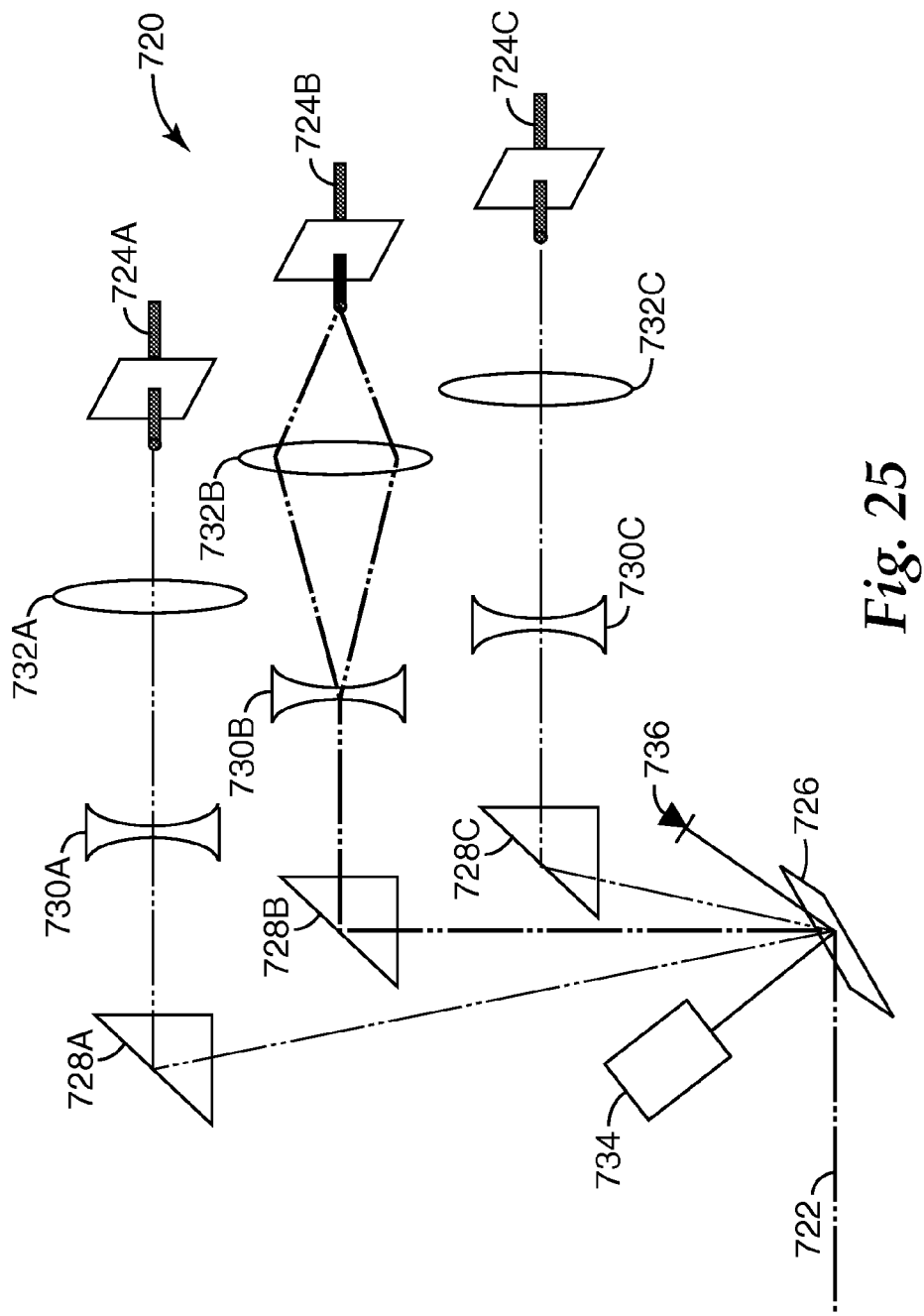
FIG. 25 is a block diagram illustrating an exemplary beam splitting system for splitting a laser beam into multiple beams focused into respective fiber optic cables.

As a further example, a single beam may be split using oscillating mirrors to split a laser beam and focus each of the split beams to a fiber optic cable. FIG. 25 is a block diagram illustrating an exemplary beam splitting system 720 for splitting a laser beam 722 into multiple beams focused into respective fiber optic cables 724A-724C. Beam splitting system 720 uses oscillating mirror 726 to split beam 722. Oscillating mirror 726 may oscillate at a constant rate, such as 400 Hz. The angle of oscillating mirror 726 may be synchronized to match the firing of a laser pulse of laser beam 722 with the channel that the beam will be delivered to. A reflection of laser beam 722 off of oscillating mirror 726 is picked up by one of prisms 728A-728C. In the example of FIG. 25, the reflection is picked up by prism 728B. The beam is then shaped by beam expanding lens 730B and beam focusing lens 732B. After beam shaping, beam focusing lens 732B focuses the beam to the entrance of fiber optic cable 724B. The distance between one of beam expanding lenses 730A-730C and the corresponding one of beam focusing lenses 732A-732C may be adjusted to control the numerical aperture (NA) of the laser beam focused on the entrance of the respective one of fiber optic cables 724A-724C. Beam splitting system 720 also includes continuous wave reference laser 734, which is reflected by oscillating mirror 726 and picked up by photo detector (PD) 736. The pulsed output from photo detector 736 provides a reference for synchronization of oscillating mirror 726.

Figure 26:
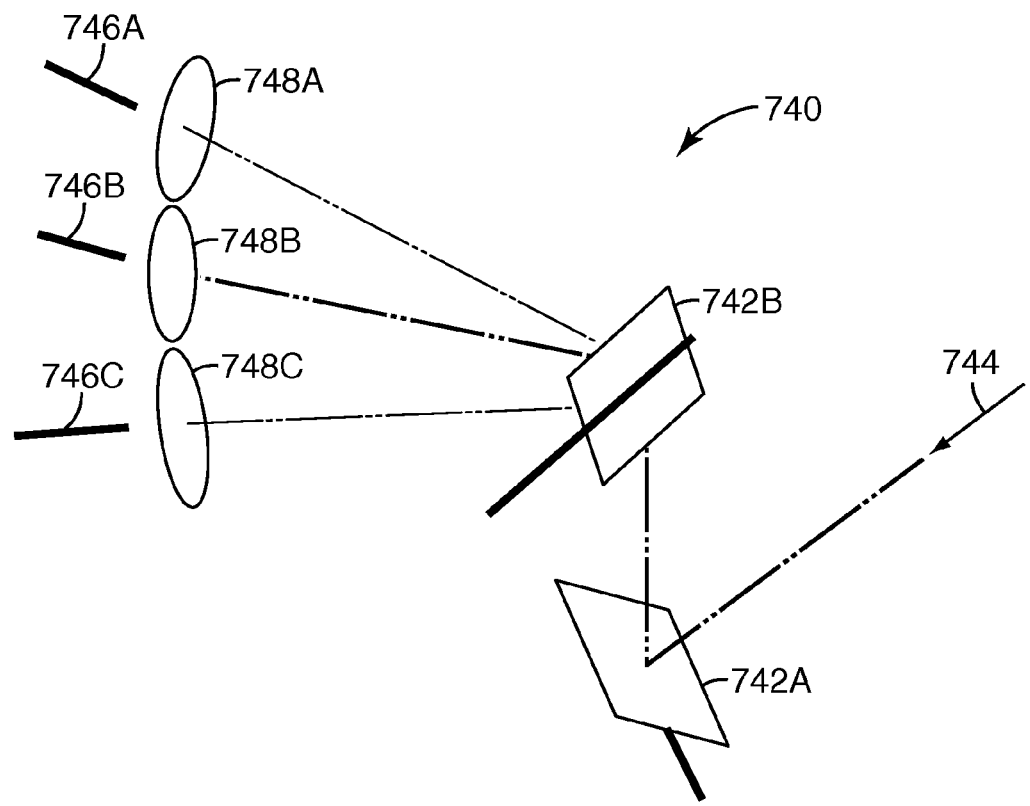
FIG. 26 is a block diagram illustrating an example beam splitting system that uses a pair of galvanometer mirrors to split an incident laser beam into multiple beams for multiple channels.

As another example, a single beam may be split using a galvanometer mirror system to reflect one laser beam into multiple beam channels. FIG. 26 is a block diagram illustrating an example beam splitting system 740 that uses a pair of galvanometer mirrors 742A and 742B ("galvanometer mirrors 742") to split an incident laser beam 744 into multiple beams for multiple channels. Using two galvanometer mirrors 742 allows laser beam 744 to be scanned to a two-dimensional array. In other embodiments, more than two or fewer than two galvanometer mirrors 742 may be used. System 740 may use galvanometer scanners (not shown) having encoders that control the angle positions of galvanometer mirrors 742. The angle positions of galvanometer mirrors 742 may be synchronized with firing of incident laser beam 744 and the physical positions of coupling lenses 748A-748C and fiber optic cables 746A-746C. System 740 may use galvanometer scanners (not shown) to accurately direct laser beam 744 to a specified channel. Laser beam 744 may be a pulsed laser beam that comprises a stream of discrete pulses of laser energy. System 740 may control the galvanometer mirrors 742 to be synchronized with the discrete pulses. For example, system 740 may control the galvanometer mirrors 742 to change positions between each pulse to direct the beam to different optical paths. The scanning speed of galvanometric scanners may be on the order of 20-40 Hz, which may correspond to approximately one degree angle per millisecond.

Figure 27:
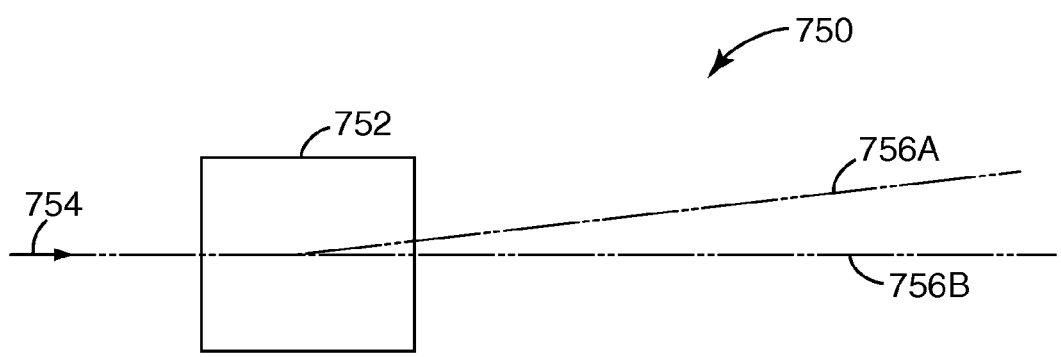
FIG. 27 is a block diagram illustrating an example beam splitting system that uses an acoustic optical (AO) modulator that splits an incident laser beam into multiple channels.

As yet another example, an acoustic optical modulator may be used to split a beam. FIG. 27 is a block diagram illustrating an example beam splitting system 750 that uses an acoustic optical (AO) modulator 752 that splits an incident laser beam 754 into multiple channels. AO modulator 752 deflects incident laser beam 754 when an acoustic grating is applied to a crystal. For example, NEOS AO modulator model N35110-3-350-I is made from crystal quartz, and has a switching speed of 100 ns/mm times the incident beam diameter. The deflection angle is 6.8 mrad. Due to its capability for fast and "small" angle switching, AO modulator 752 may be used to switch laser beam 754 to or from one or more channels 756A, 756B. AO modulator 752 may be optimized to deflect beam 754 to a first order grating diffraction or both first and second order grating diffraction. When AO modulator 752 is on, light may still be leaked to the "off" channel, i.e., the beam path that would be followed when the AO modulator 752 is off or the $0^{th}$ order when no diffraction. It may therefore be preferable to use the beam path when AO modulator 752 is active ($1^{st}$ order diffraction) to do any imaging, and use the beam path when the AO modulator 752 is relaxed ($0^{th}$ order diffraction) to stop or dump the beam. Thus, the $1^{st}$ order diffraction channel may be the preferred channel to switch beam 754 to an operating channel, and $0^{th}$ order diffraction channel may be connected to a beam dumper.

As a further example, a single beam may be split using a rotating polygon having reflective edges. Alternatively, a single beam may be split using Pockels cells to switch an incident beam of polarized light into two channels. Using this technique may allow for switching at a rate of 1 MHz, which may allow desired channels to be selected in random orders. This is in contrast to the oscillating mirror, galvanometer mirror system, or rotating polygon, which may require that channels are accessed sequentially based on their spatial positions.

Sheeting imaged according to the techniques described above may be used in a number of applications, including security, automotive, brand authentication, brand enhancement, and consumer decorative applications. For example, the floating image of the sheeting may be used for a floating watermark as a translucent overlay, providing a secure feature through which printed information is visible. The sheeting may be made very thin (<1 mm), which may enable integration of the sheeting into security documents, passports, drivers licenses, currency, banknotes, identification cards, titles, personnel badges, proofs of purchase, authenticity certificates, corporate cards, financial transaction cards (e.g. credit cards), certificates, brand and asset protection labels, registration tags, tax stamps, gaming chips, license plates, automotive consoles, decorative labels, signage, validation stickers, or other items.

Various modifications and combinations of the embodiments disclosed will be apparent to those skilled in the art, and those modifications are intended to be within the scope of the invention as defined in the appended claims.

We claim:

1. A method comprising:
    illuminating a sheeting having a surface of microlenses with a divergent energy beam to form a plurality of images within the sheeting, wherein a center of the energy beam is offset from a surface normal of the sheeting, wherein at least one of the images formed within the sheeting is a partially complete image, and wherein the images are associated with different microlenses of the sheeting,
    wherein the microlenses have refractive surfaces that transmit light to positions within the sheeting to produce one or more composite images from the images formed within the sheeting that appears to float with respect to the surface of the sheeting.

2. The method of claim 1, wherein illuminating a sheeting comprises illuminating the sheeting to produce a plurality of composite images that appear to float, and
    wherein each of the composite images is visible at a different viewing angle range with respect to the surface of the sheeting.

3. The method of claim 2, wherein each of the composite images comprises a different image.

4. The method of claim 2, wherein each of the composite images is formed by respective sets of images, and wherein each of the respective sets of images is associated with a common subset of the microlenses.

5. The method of claim 2, wherein illuminating the sheeting comprises:
    illuminating the sheeting to form one or more images associated with a first one of the plurality of composite images by illuminating the sheeting with the energy beam via an optical train comprising a final objective and a Fresnel lens positioned after the final objective to position the energy beam such that the center of the energy beam is offset from the surface normal by a first angle; and
    illuminating the sheeting to form one or more images associated with a second one of the plurality of composite images by illuminating the sheeting with the energy beam via the optical train configured to position the energy beam such that the center of the energy beam is offset from the surface normal by a second angle.

6. The method of claim 5, further comprising repositioning the Fresnel lens after illuminating the sheeting to form the images associated with the first one of the plurality of composite images and before the sheeting to form the images associated with the second one of the plurality of composite images.

7. The method of claim 2, wherein forming the images to produce the plurality of composite images comprises forming the images substantially simultaneously with respect to each of the composite images.

8. The method of claim 7, wherein forming the images substantially simultaneously comprises illuminating the sheeting with the energy beam via an assembly comprising a plurality of optical objectives to simultaneously form the plurality of composite images, wherein each of the composite images is associated with a different one of the plurality of optical objectives.

9. The method of claim 8, wherein a focal point of each of the optical objectives overlaps with a focal point of at least one other of the plurality of optical objectives.

10. The method of claim 8, further comprising splitting the energy beam among the plurality of objectives of the assembly.

11. The method of claim 10, wherein splitting the energy beam comprises splitting the energy beam using one of an optical grating, an oscillating mirror, a galvanometer mirror, and an acoustic optical modulator.

12. The method of claim 1, wherein illuminating the sheeting comprises illuminating the sheeting with an energy beam controlled by a six-axis robot arm.

13. The method of claim 1, wherein illuminating the sheeting comprises illuminating the sheeting with an energy beam controlled by a galvanometer scanner.

14. The method of claim 13, wherein the galvanometer scanner controls the radiation source to move at a rate of at least 200 mm/sec.

15. The method of claim 1, wherein illuminating the sheeting comprises illuminating the sheeting with a radiation source via an optical train comprising an array of lenses having numerical apertures of greater than 0.3.

16. A sheeting comprising:
a layer of material having a surface of microlenses that form a plurality of three-dimensional images within the sheeting, wherein at least one of the images formed within the sheeting is a partially complete image, and wherein the images are associated with different microlenses of the sheeting,
wherein the microlenses have refractive surfaces that transmit light to positions within the sheeting to produce one or more composite images from the images formed within the sheeting that appears to float with respect to the surface of the sheeting.

17. The sheeting of claim 16, wherein the plurality of images formed within the sheeting cause the microlenses to produce a plurality of composite images, wherein each of the composite images is visible at a different viewing angle range.

18. The sheeting of claim 17, wherein each of the composite images comprises a different image.

19. The sheeting of claim 17, wherein the viewing angle ranges associated with each of the composite images overlap to form a continuous viewing angle range.

20. The sheeting of claim 17, wherein the viewing angle ranges associated with each of the composite images comprise non-overlapping viewing angle ranges.

21. The sheeting of claim 16, wherein an apparent distance that the composite image appears to float above or below the plane of the sheeting exhibits a continuous transition from a first distance to a second distance.

* * * * *